(12) United States Patent
Gaos

(10) Patent No.: US 7,319,992 B2
(45) Date of Patent: Jan. 15, 2008

(54) METHOD AND APPARATUS FOR DELIVERING A VIRTUAL REALITY ENVIRONMENT

(75) Inventor: Maria Gaos, Mountlake Terrace, WA (US)

(73) Assignee: The Mission Corporation, Mountlake Terrace, WA (US)

( * ) Notice: Subject to any disclaimer, the term of this patent is extended or adjusted under 35 U.S.C. 154(b) by 833 days.

(21) Appl. No.: 09/964,224

(22) Filed: Sep. 25, 2001

(65) Prior Publication Data
US 2003/0046689 A1    Mar. 6, 2003

Related U.S. Application Data

(60) Provisional application No. 60/235,777, filed on Sep. 25, 2000.

(51) Int. Cl.
G06T 15/00    (2006.01)
(52) U.S. Cl. .................................. 706/62; 715/757
(58) Field of Classification Search ................ 706/62; 703/2, 6; 715/757
See application file for complete search history.

(56) References Cited

U.S. PATENT DOCUMENTS 5,983,200 A * 11/1999 Slotznick .................... 705/26
6,057,856 A * 5/2000 Miyashita et al. .......... 345/633
6,061,646 A * 5/2000 Martino et al. ................ 704/3

\* cited by examiner

*Primary Examiner*—Anthony Knight
*Assistant Examiner*—Nathan H. Brown, Jr.
(74) *Attorney, Agent, or Firm*—Axios Law Group; Adam Philipp

(57) ABSTRACT

Described is a method and apparatus for generating a customized dynamic virtual reality environment. The dynamic virtual reality environment communicates with a participant via a virtual personal assistant utilizing an input/output arrangement. The virtual personal assistant engages the participant in a natural language conversation to obtain the participant's preferences and personal information. The virtual personal assistant utilizes an artificial intelligence engine to recognize a plurality of natural languages. Information obtained from the conversation may be translated into a request for information, services or products. The virtual personal assistant may retrieve any of these from a plurality of remote servers via a communications network and present the data to the participant. Information obtained from the conversation may be used to evolve both the virtual reality environment and the virtual personal assistant. Both are continuously learning and adapting to the participant and become more personalize following every use.

4 Claims, 19 Drawing Sheets

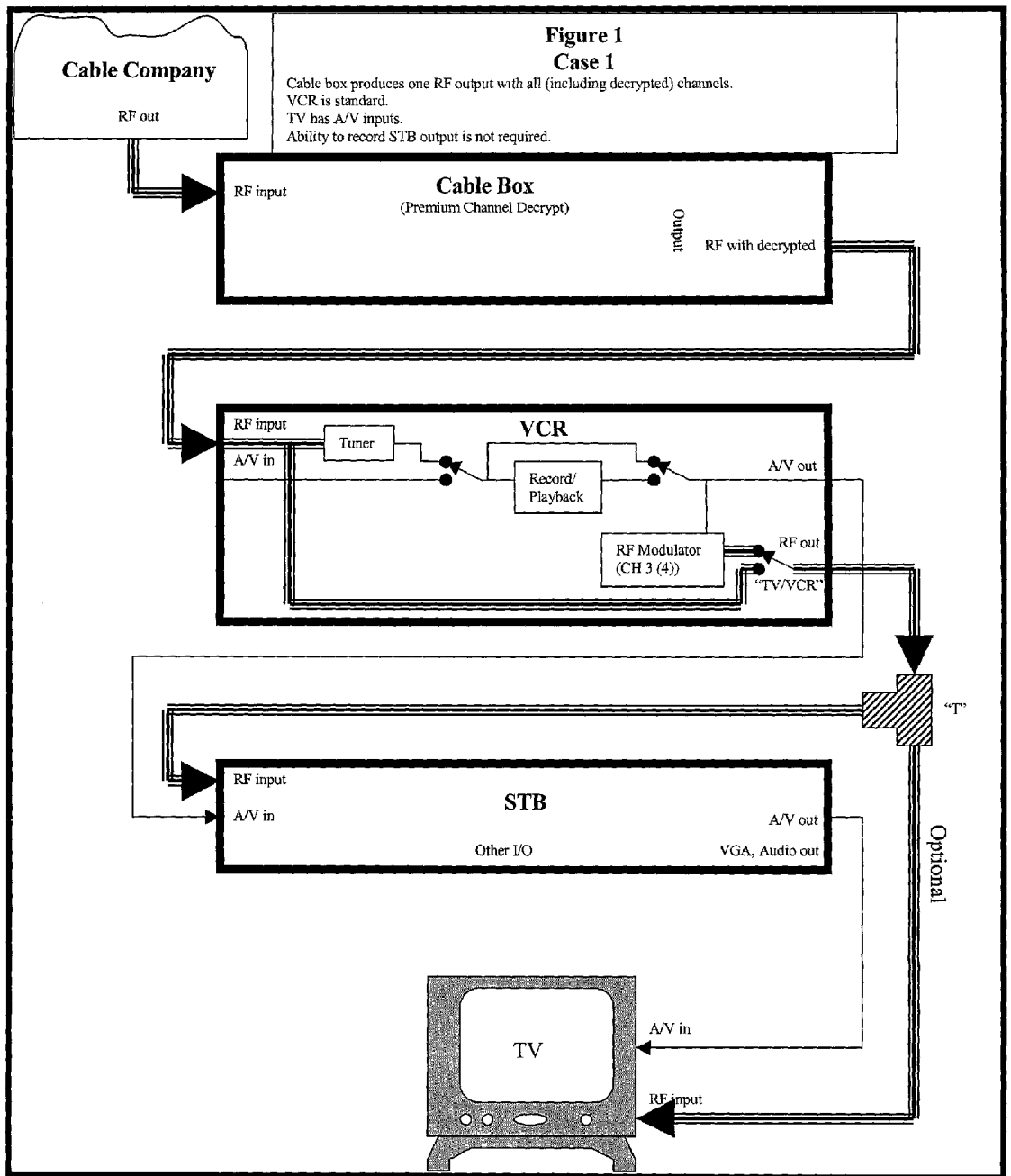

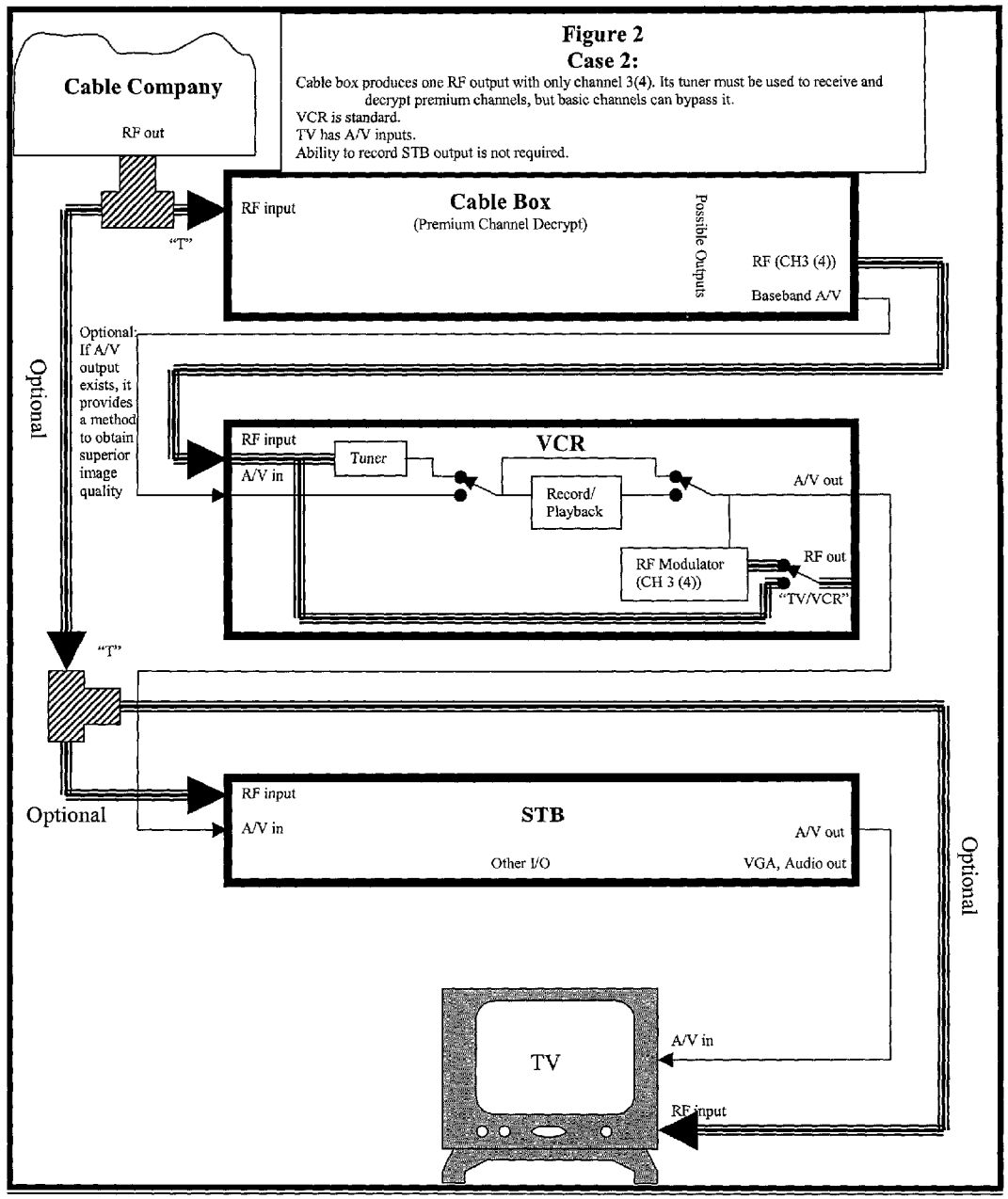

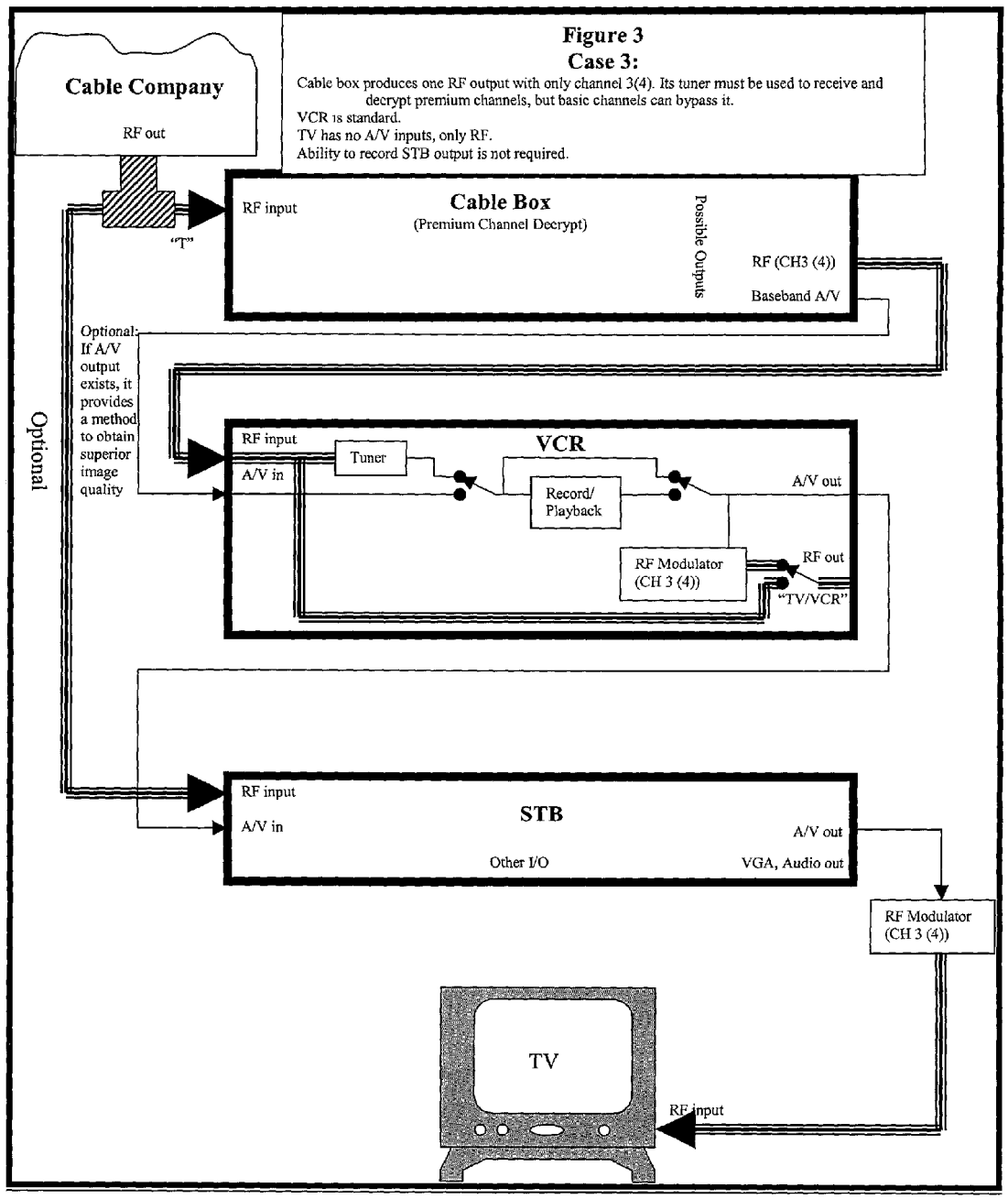

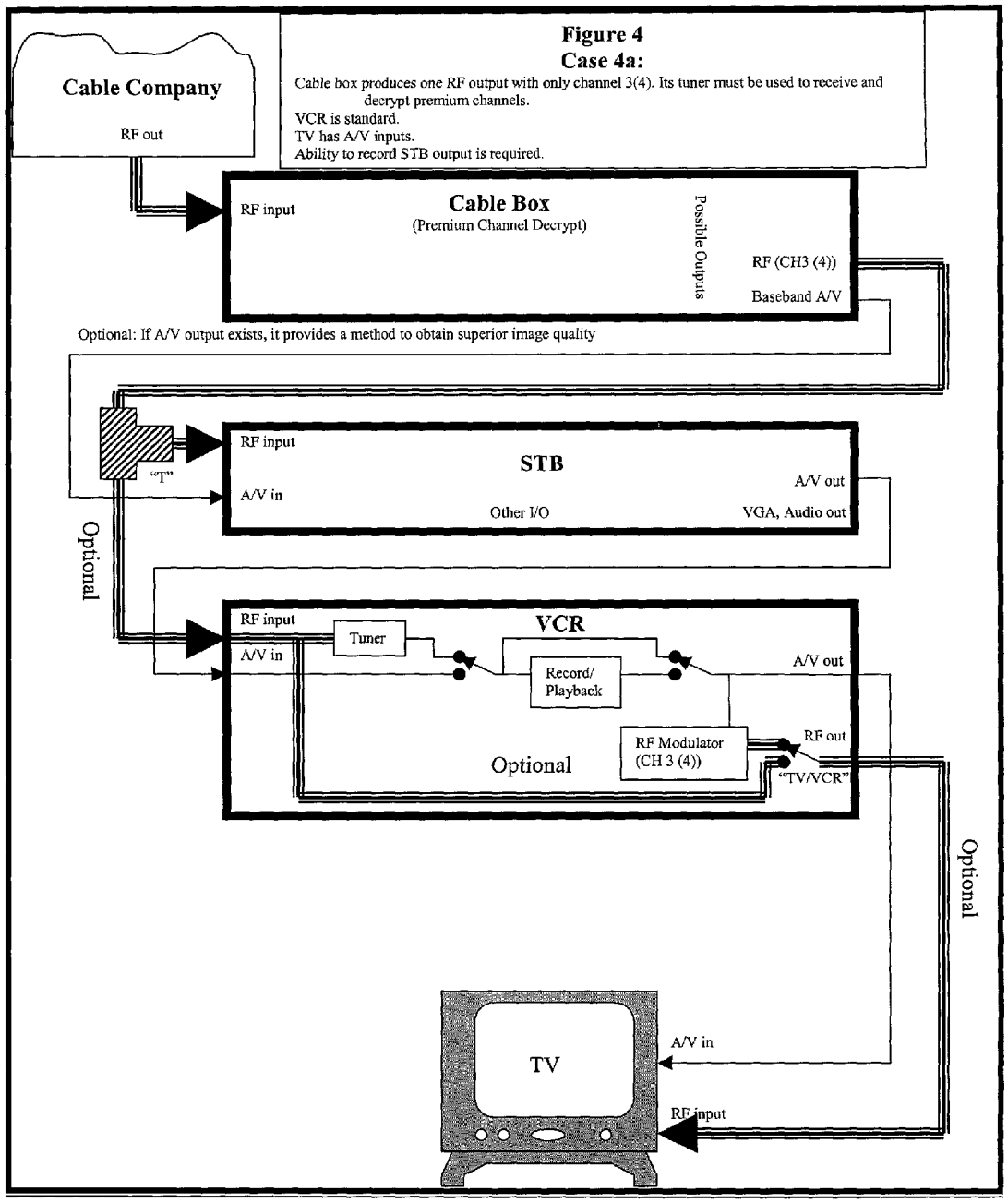

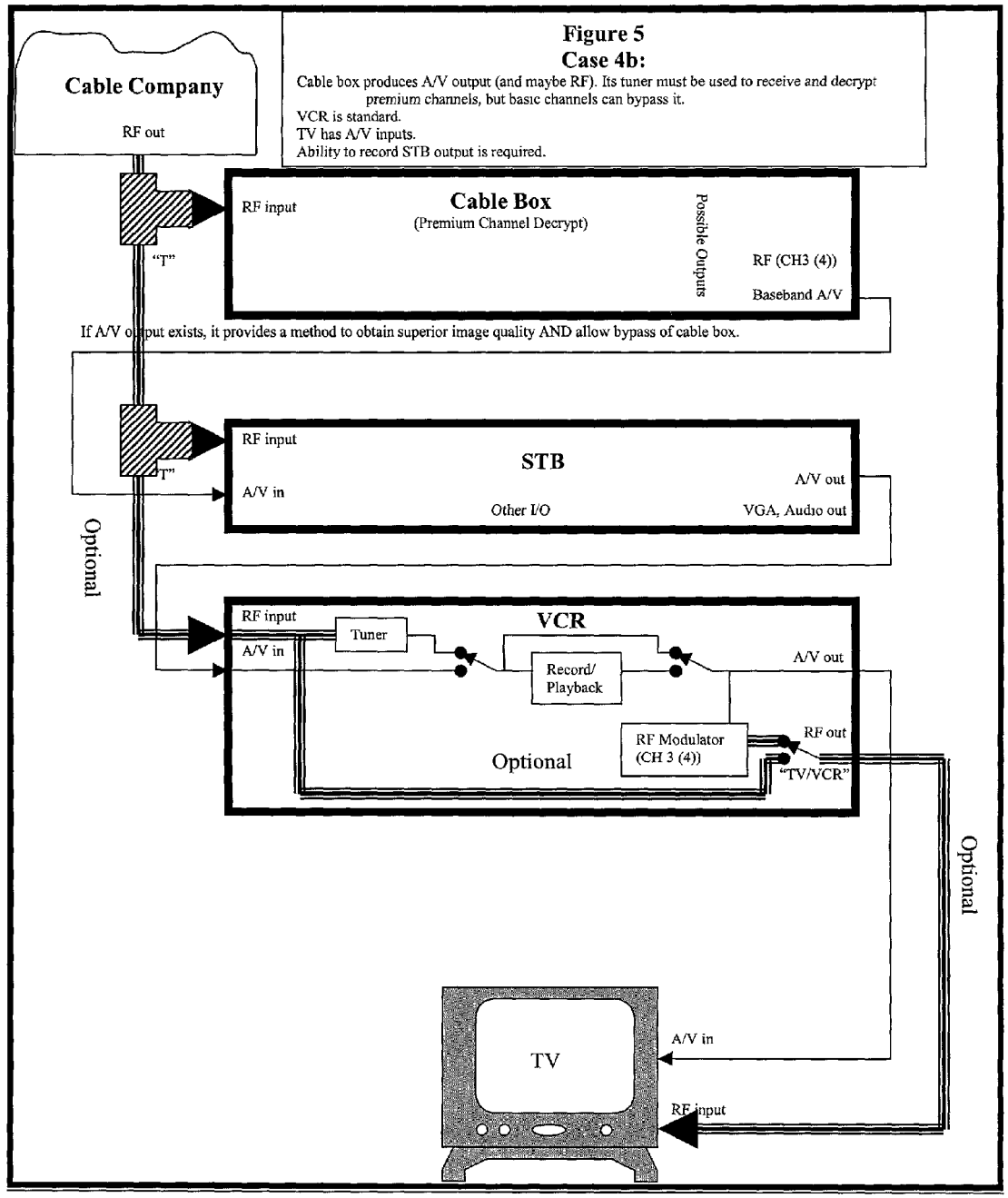

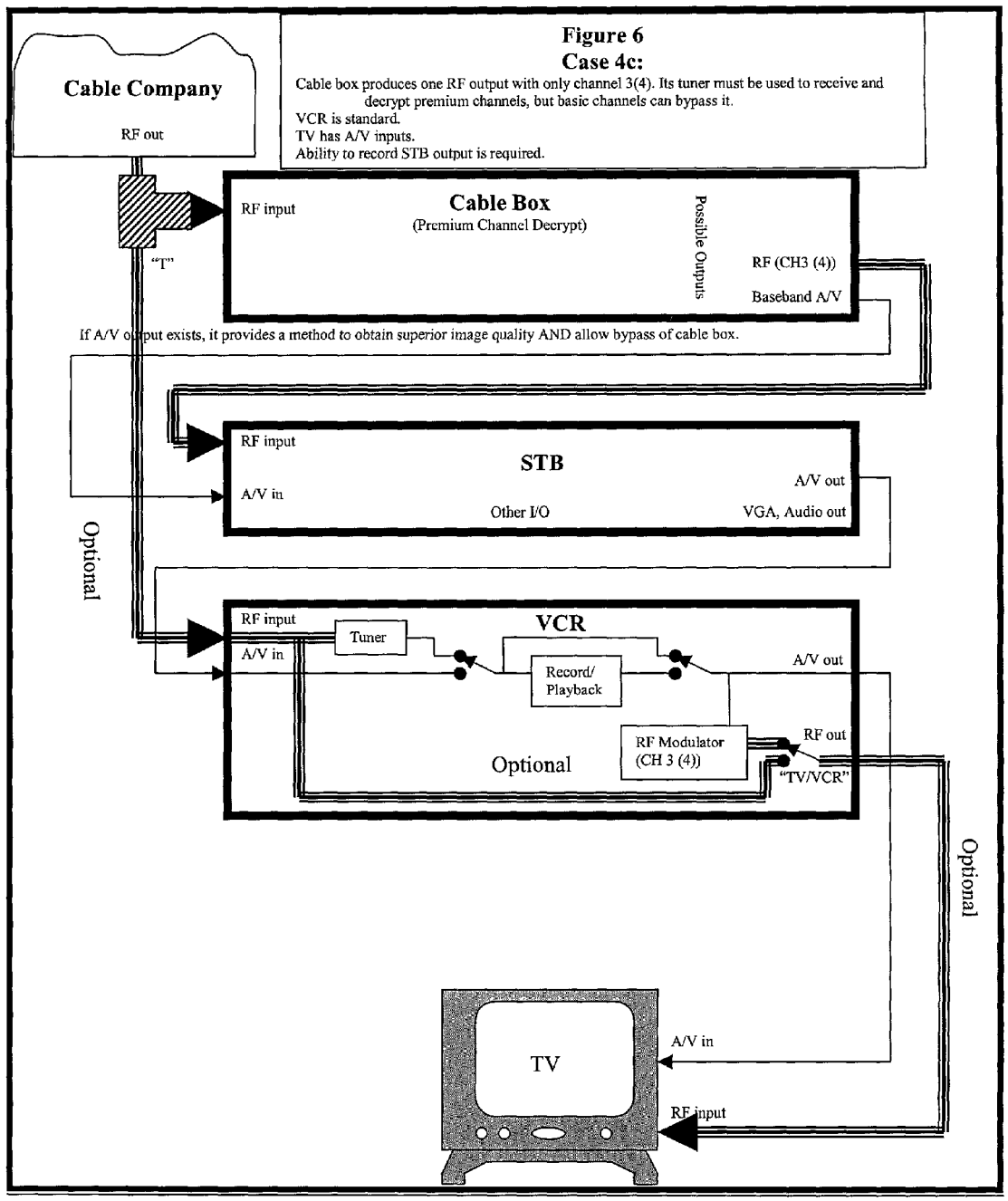

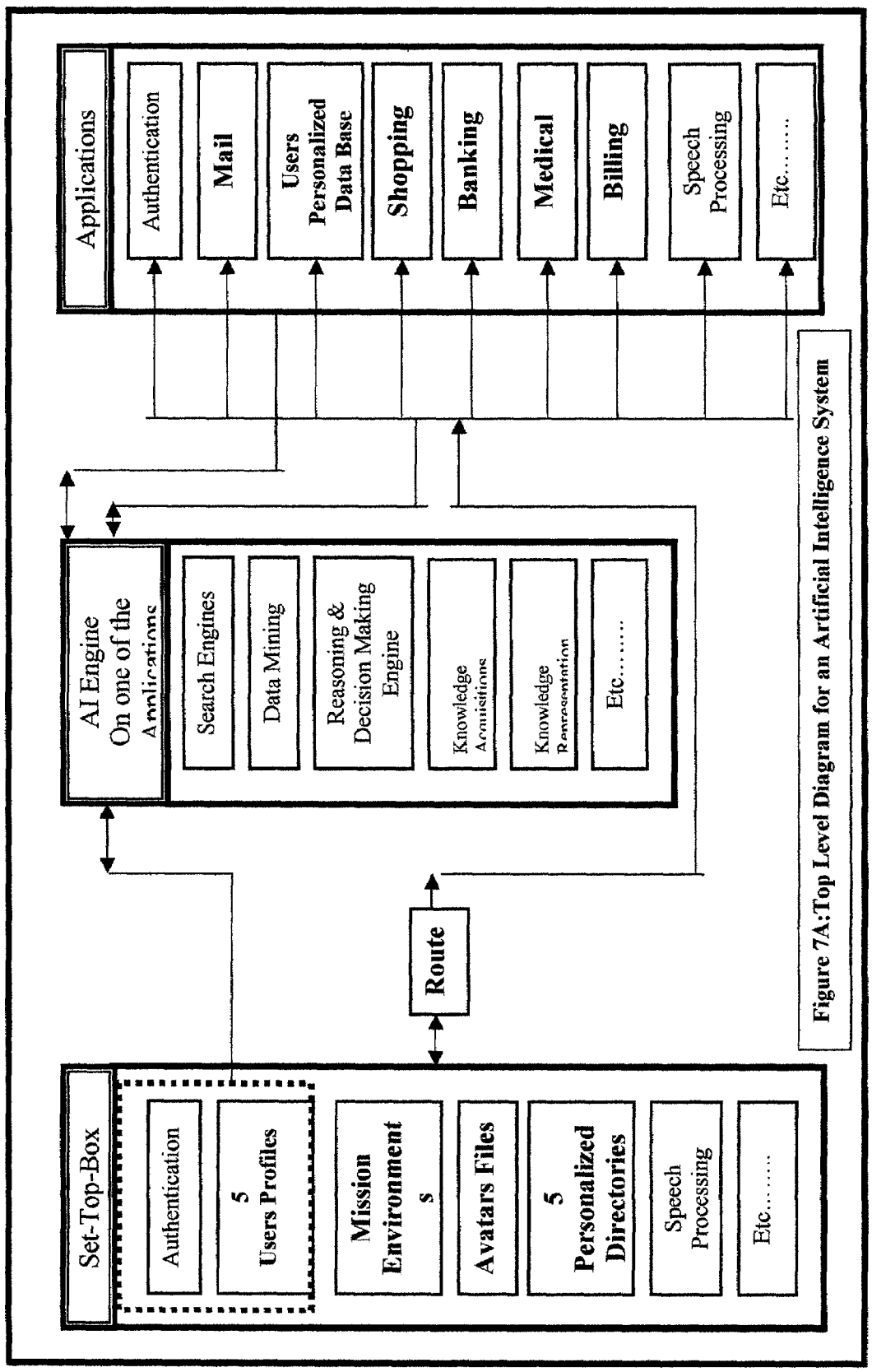
Figure 7A: Top Level Diagram for an Artificial Intelligence System

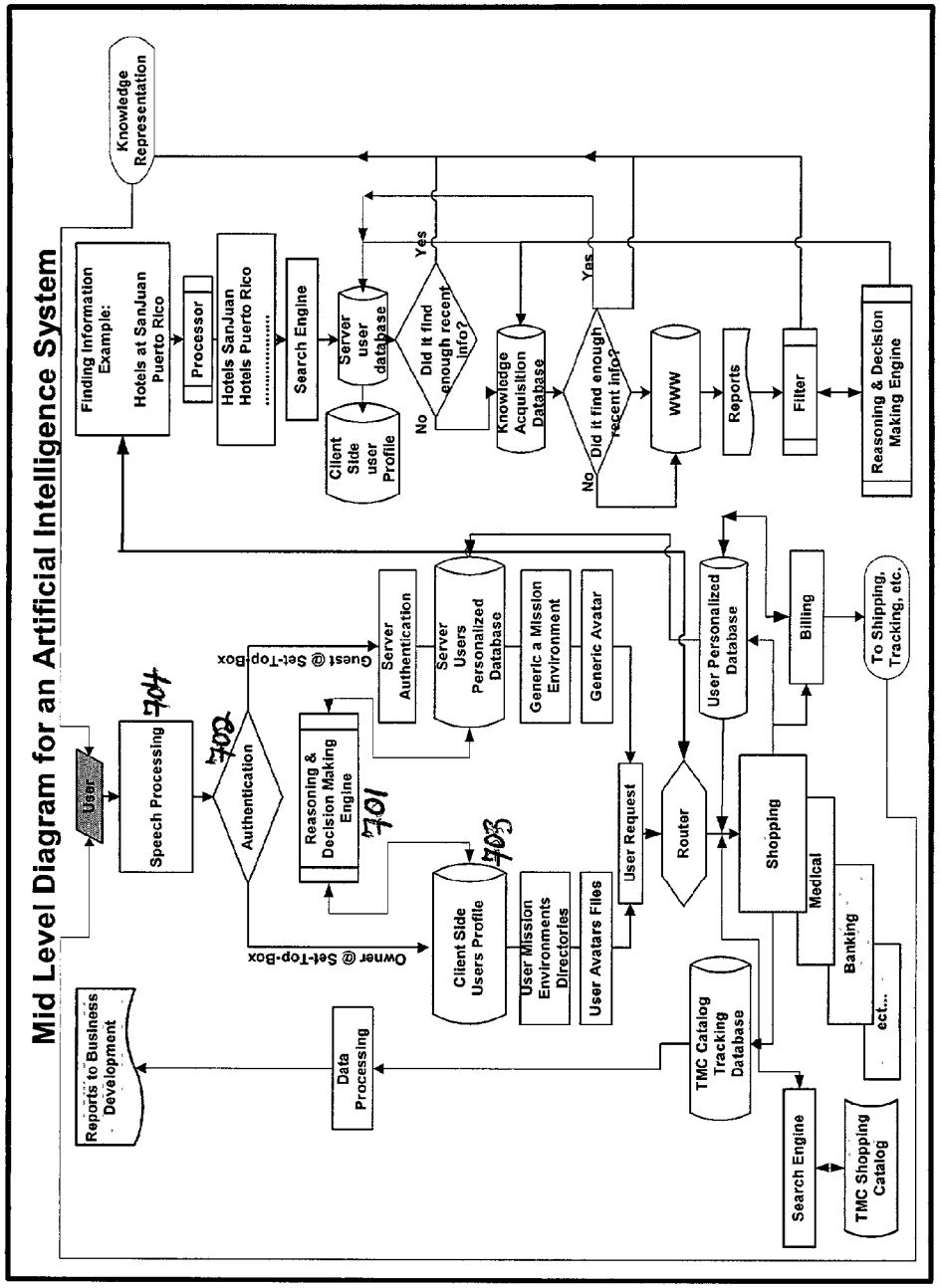
Figure 7B: Mid Level Diagram for an Artificial Intelligence

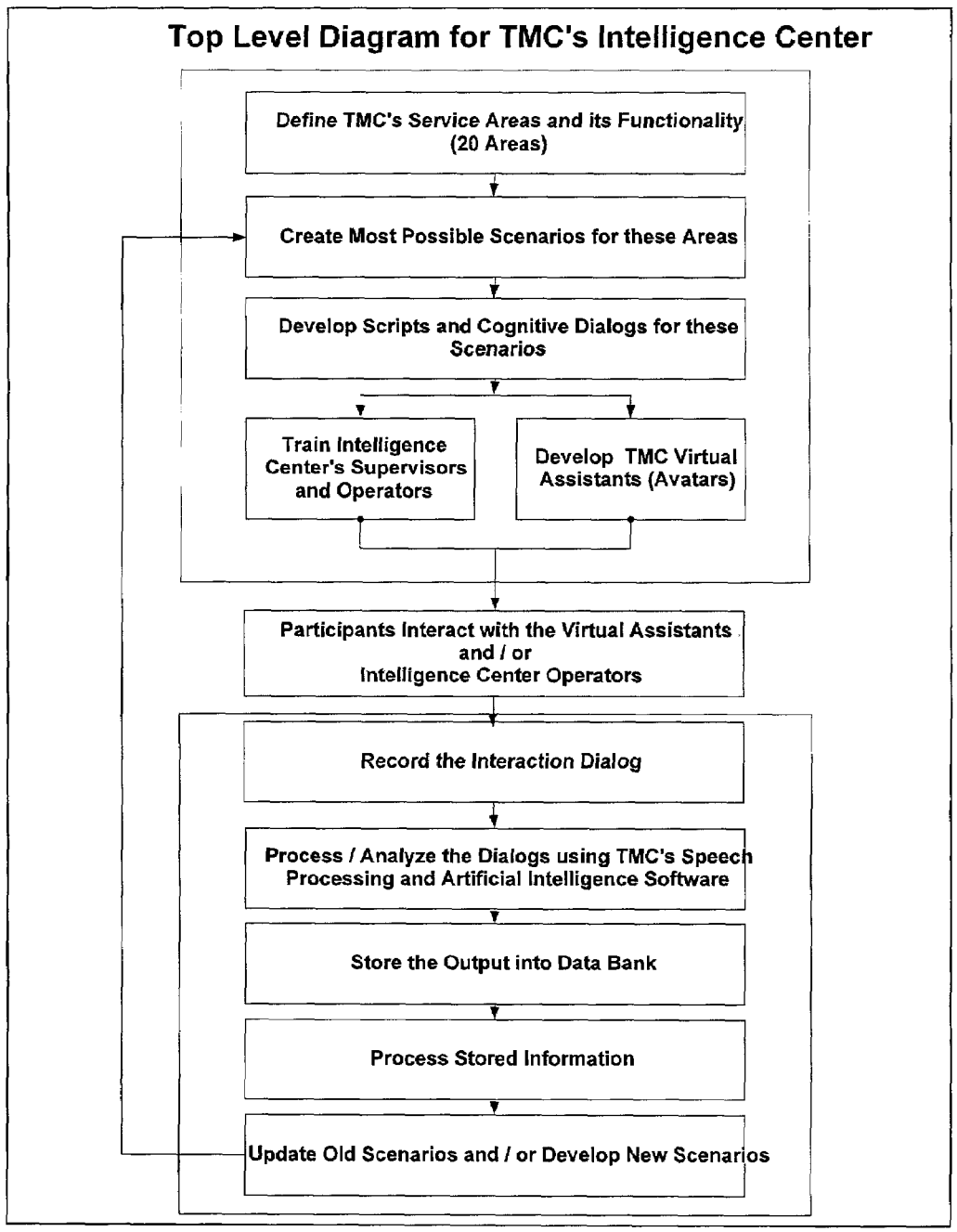
Figure 8: Top Level Diagram for TMC Intelligence Center

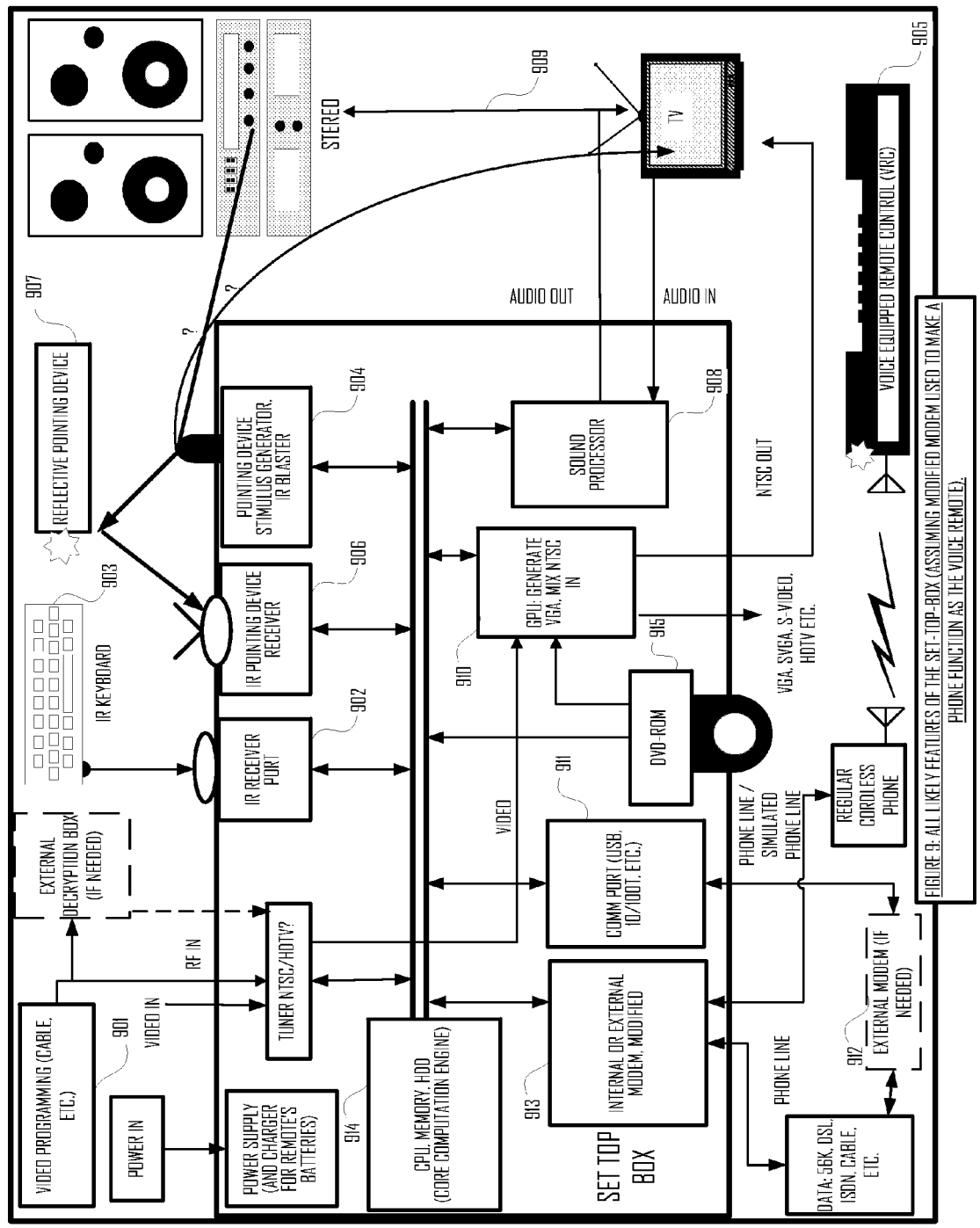

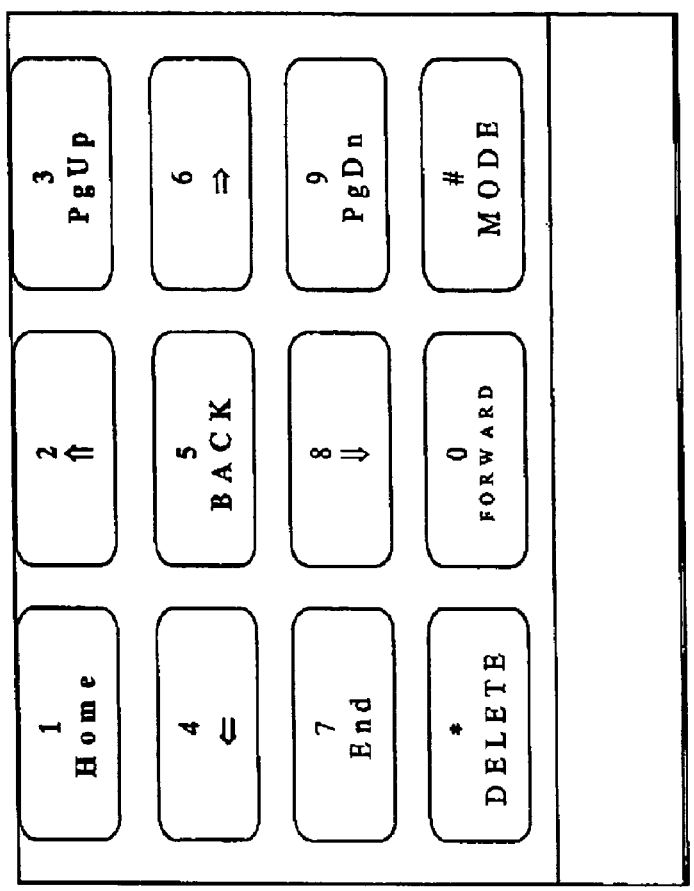
Figure 10: A suggested Assignment of Functions for DTMF Keypad

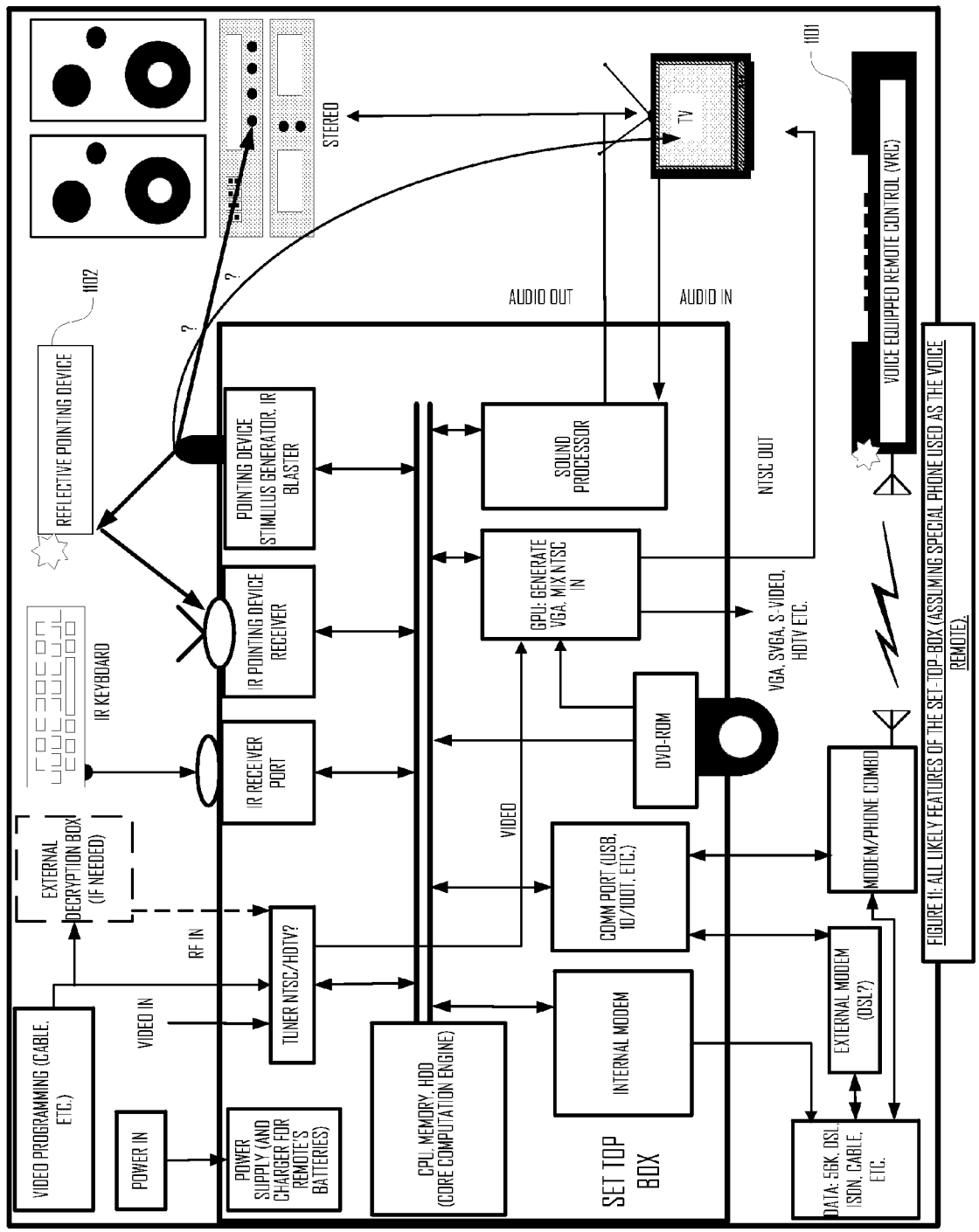

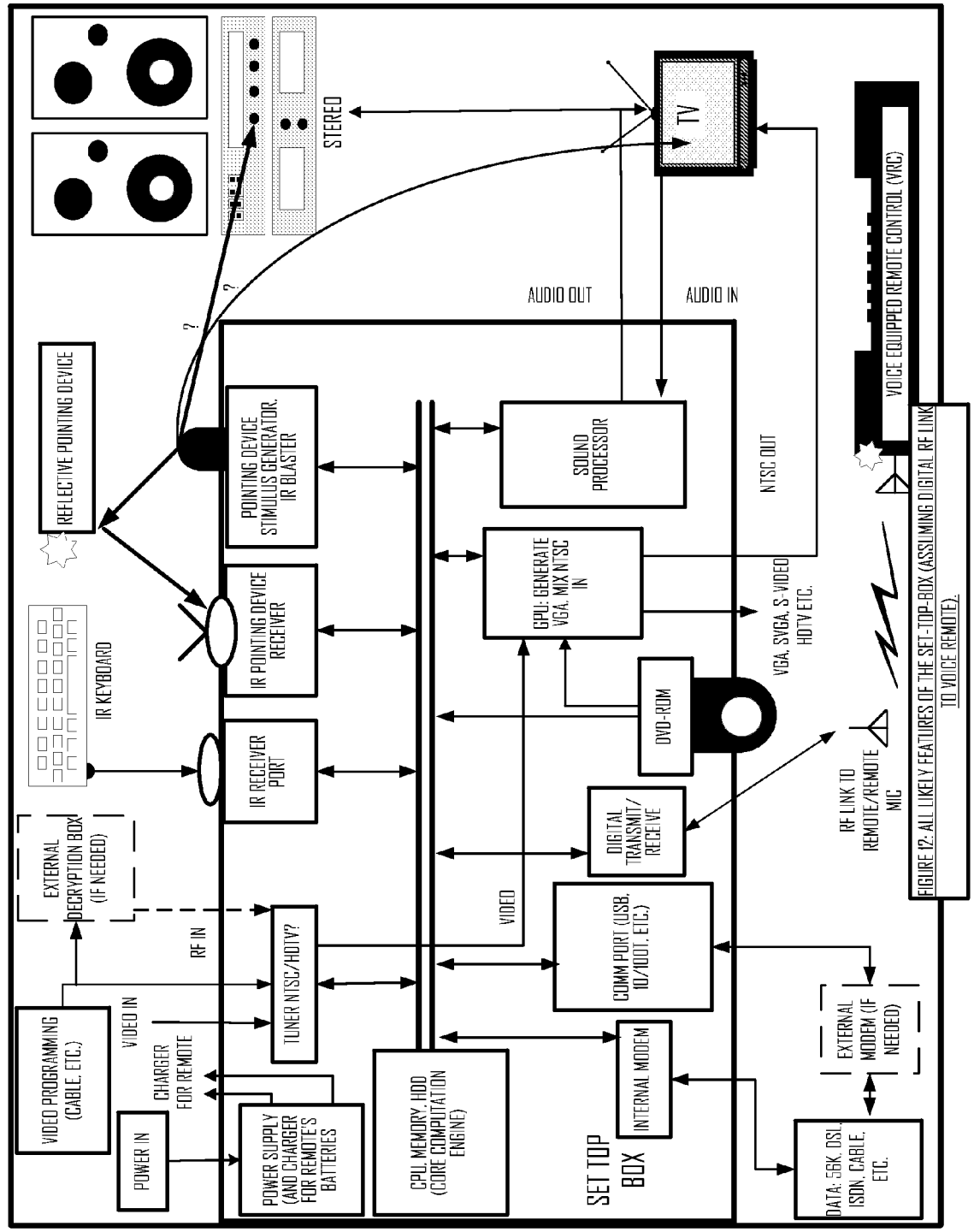

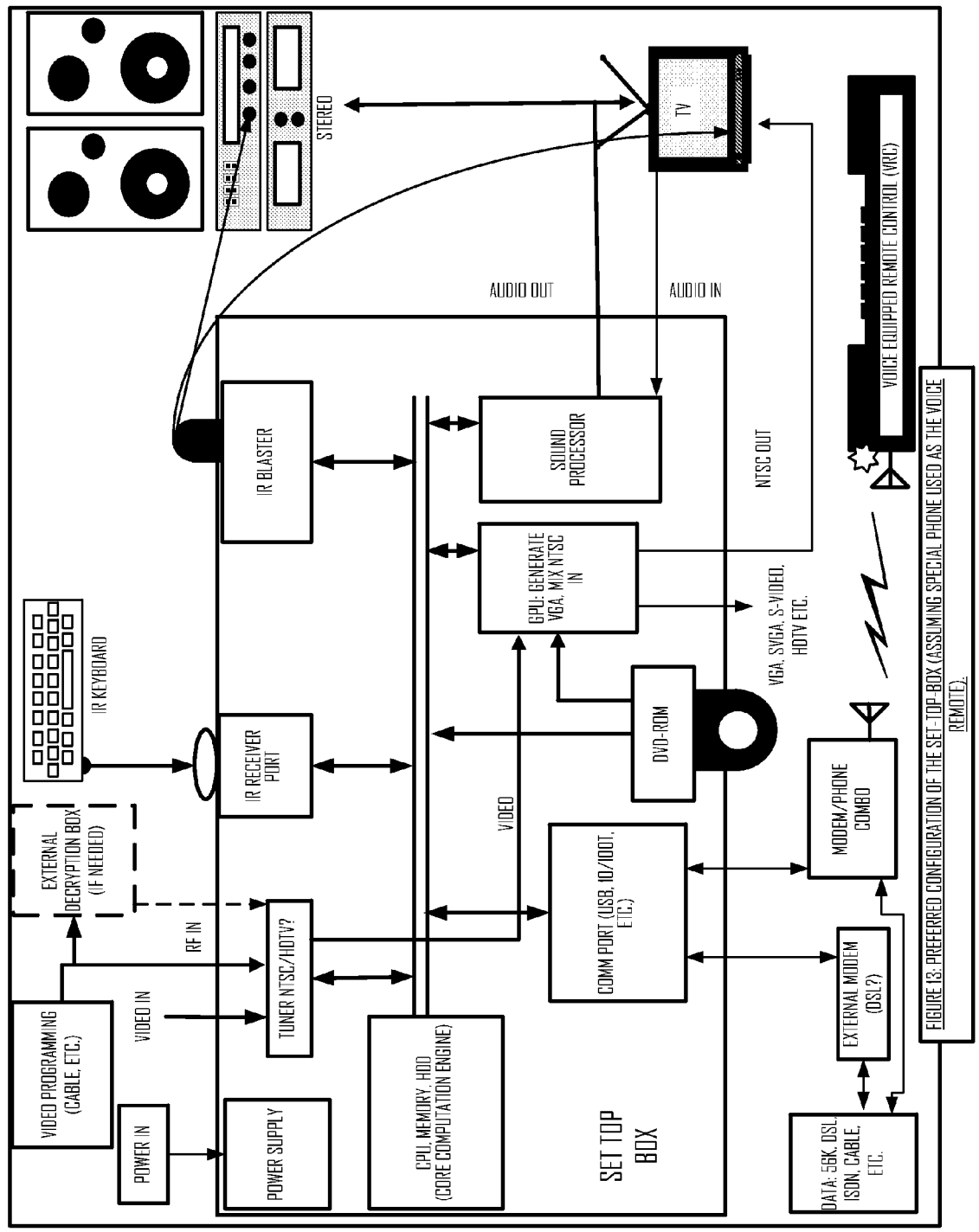

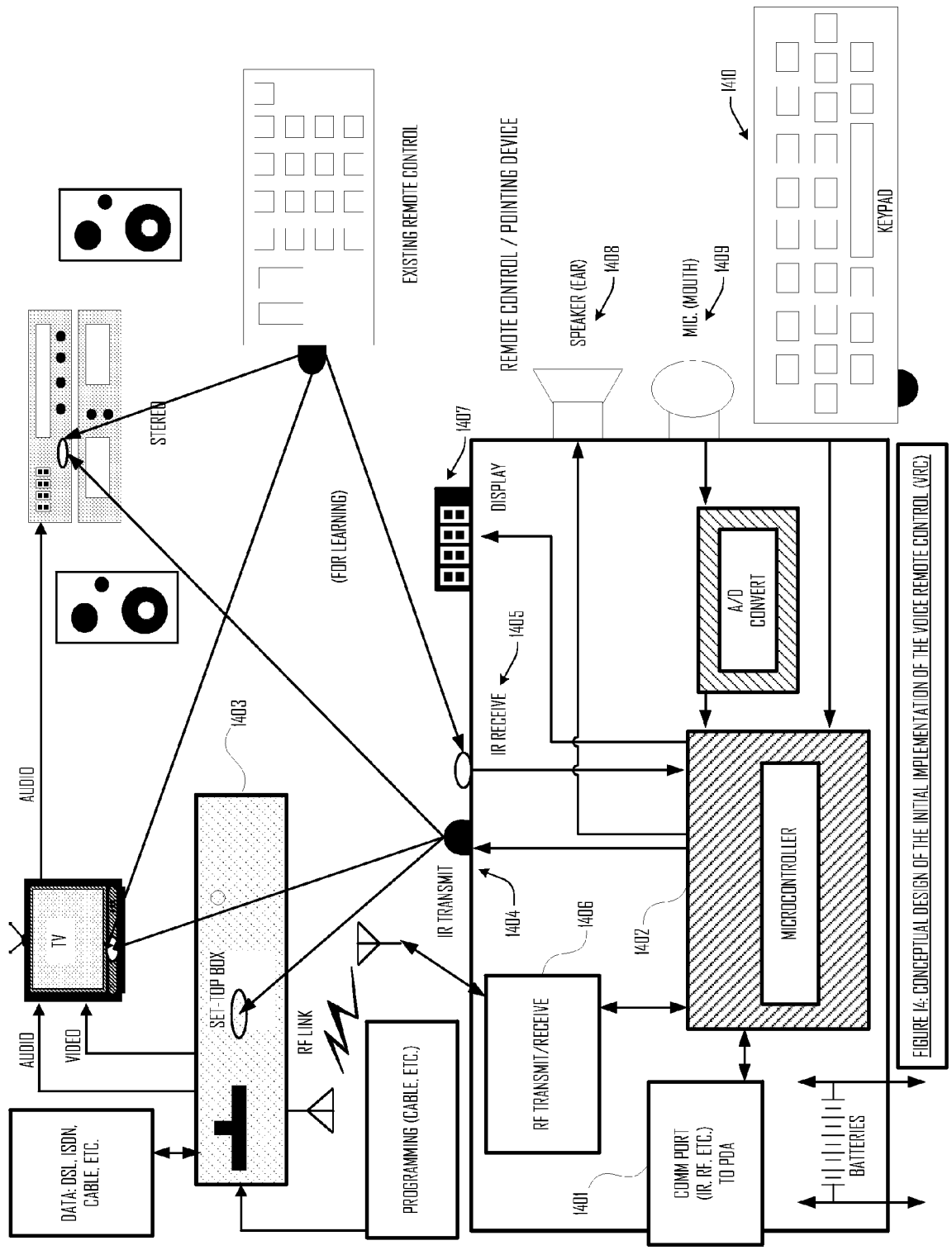

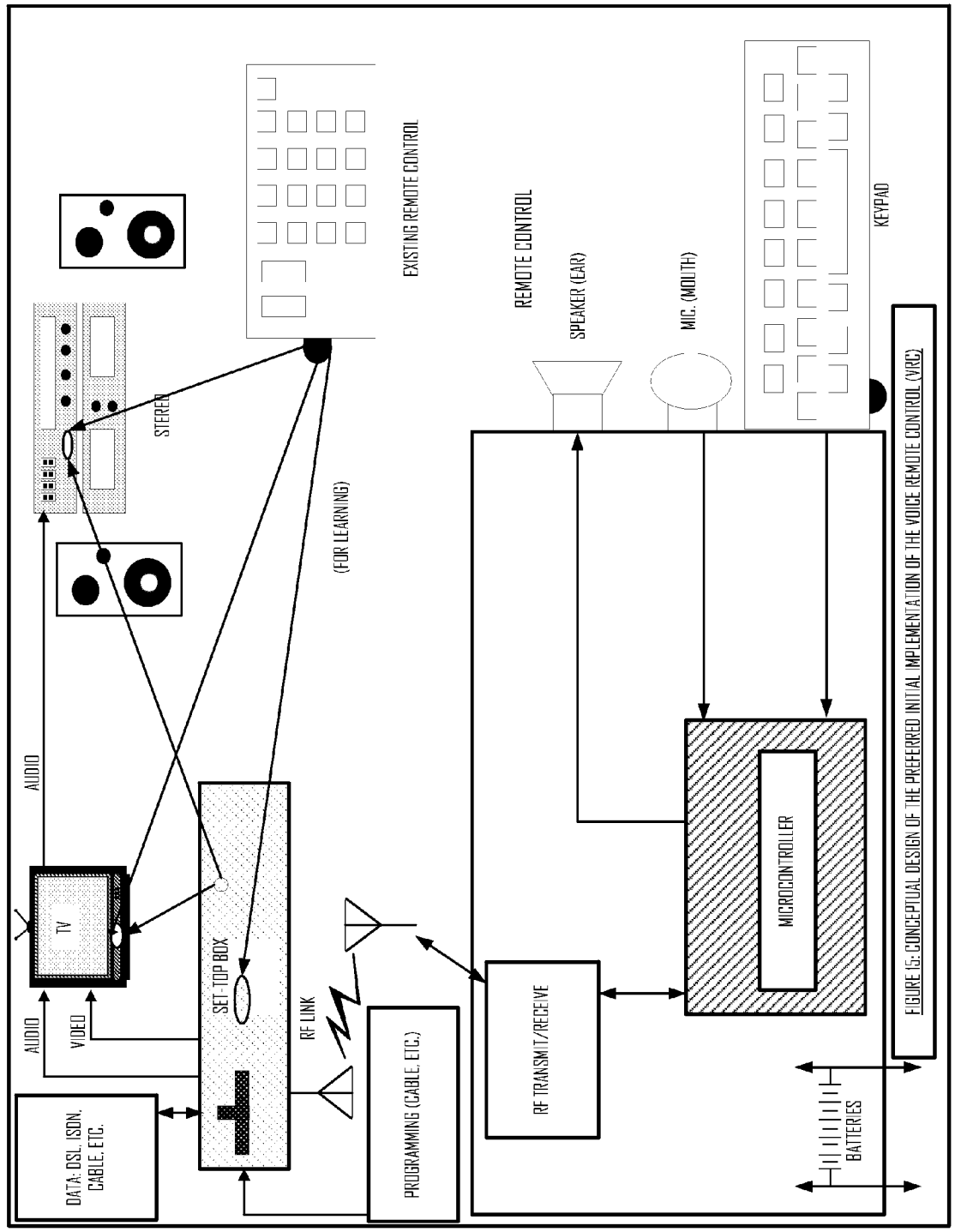

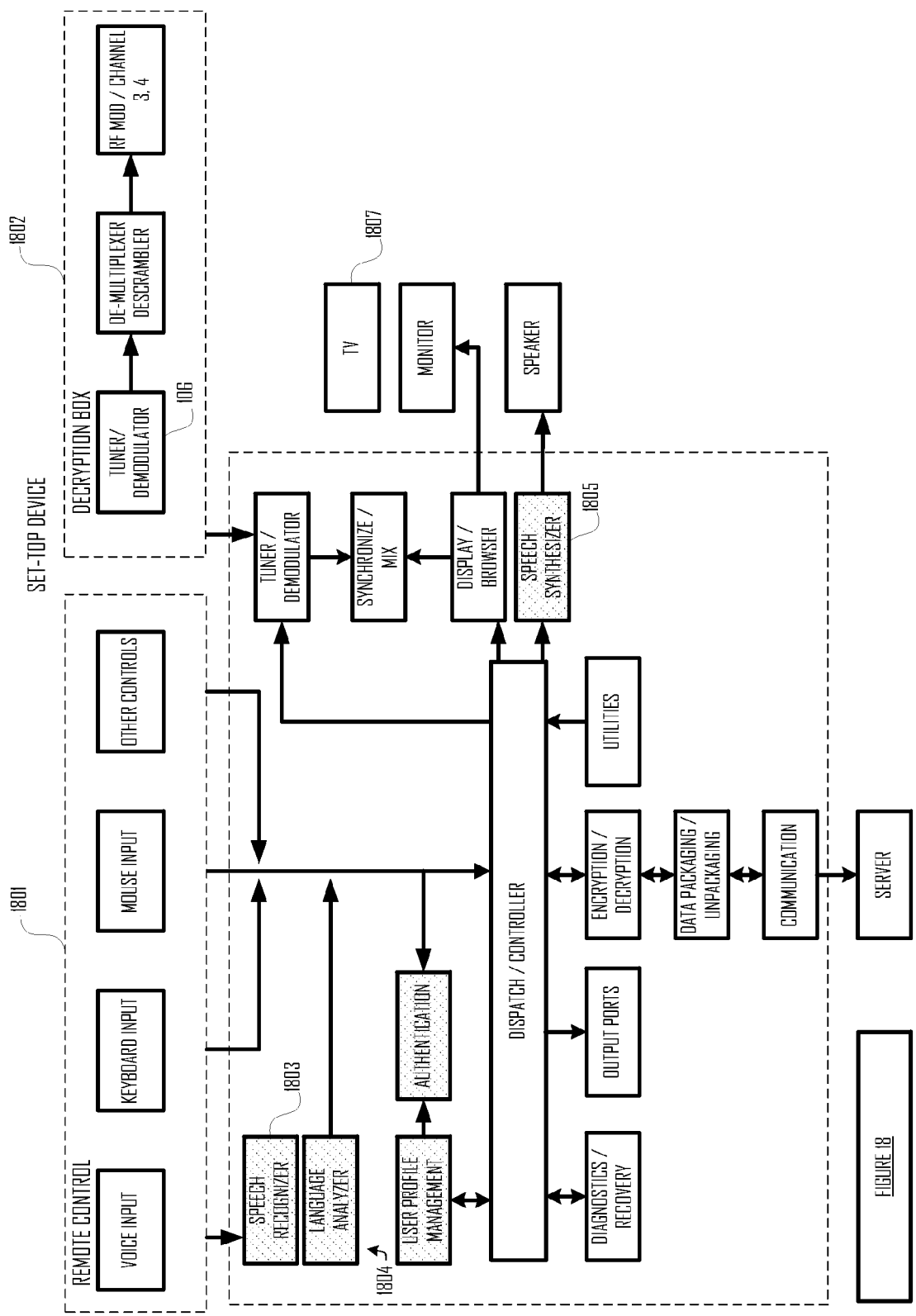

METHOD AND APPARATUS FOR DELIVERING A VIRTUAL REALITY ENVIRONMENT

CROSS REFERENCE TO RELATED APPLICATIONS

This application claims the benefit of the filing date of provisional application Ser. No. 60/235777, filed Sep. 25, 2000, the entire disclosure of which is incorporated by reference herein as if fully set forth in its entirety, which was assigned by María Gaos to The Mission Corporation pursuant to an agreement executed on Sep. 25, 2000.

STATEMENT REGARDING FEDERALLY SPONSORED RESEARCH AND DEVELOPMENT

Not applicable.

BACKGROUND OF THE INVENTION

1. Field of the Invention

This invention relates to global communications networks, and more specifically to delivering an easy to use virtual reality environment to take advantage of existing technologies and global communications networks such as the Internet without requiring the use of computers nor computer literacy. This invention includes an artificial intelligence assistant which receives commands through a speech recognition device, adapts to each individual user, and provides customized guidance to the user. The intelligent assistant projects human-like features and behaviors appropriate to the preferences of its user and appears as a virtual person to the user.

2. Discussion of the Background

In 1996, industry analysts propounded that, with 40 million people connected around the world, $1 billion in electronic sales, and over 10 million web addresses, the Internet as a commercial medium had come of age; 25 years after its birth under the auspices of the United States Department of Defense's Advanced Research Project Agency as a small network (ARPANET) intended to promote the sharing of super-computers among researchers in the United States.

Five years after the experts accepted the Internet as a commercial medium, the Internet today is a chaotic, overpopulated road, accessible only to the relatively few people who own and can operate computers. The virtual environment object of this invention provides a means to bypass the computer dependency for accessing today's Internet.

Today's Internet is generally deficient in several ways. First, it is very generalized in the information it provides. The Web pages are not designed for a particular person, but rather, in the best of cases, for a particular group. They do not rely on the personalized characteristics, needs or criteria of the specific user in order to narrow the choices of selection to be offered to the user. This requires excess time on the part of the user to browse through the site in order to make the proper selection. With existing search engines and query tools, users must interact with the Internet using a limited set of pre-established interactions. In addition, all users must navigate through the pre-set paths and iterations even when the bulk of the information accessible via those paths would not be applicable to that user's needs nor to the user's level of familiarity with the available information.

This shortcoming is particularly significant when one considers provisions of product information over the Internet. With worldwide access, customers from geographically diverse locations will have different requirements on available product sets when interacting with the same Web site. Different users will also have different interaction parameters with respect to the level of product detail that they require. For instance, when shopping for a camera, a professional photographer will approach the interaction with more detailed specification constraints than the user who is shopping for a camera as a gift.

As a result of the foregoing shortcomings, the Internet has modest penetration levels for a mass medium. ACNielsen NetWatch's October 1999 survey shows a penetration rate of 38% in Canada with the United States sharing second place with Australia and Singapore at 25% of the total population.

Nonetheless, the Internet has the potential to become a significant global mass medium for conducting business, collecting, and exchanging information, communication, and entertainment. International Data Corporation ("IDC") estimates that the number of Internet users worldwide will grow from approximately 142.2 million at the end of 1998 to approximately 502.4 million by the end of 2003, representing a compound annual growth rate of 29%.

As Internet usage continues to grow, advertisers and electronic commerce marketers are increasingly using the Web to locate customers, advertise and facilitate transactions. The Internet allows advertisers to more precisely target desired audiences while tracking impression levels, user demographics, and advertisement effectiveness. In addition, the Internet allows advertisers to interact more effectively with users and to more easily obtain relevant data about buying patterns, preferences and demands.

According to Forrester Research, the total worldwide dollar value of Internet advertising will increase from $3.3 billion in 1999 to $24.1 billion by 2003. Moreover, according to the IDC, the percentage of Internet users buying goods and services on the Internet will increase from approximately 22% in 1998 to approximately 36% in 2003, and the total value of goods and services purchased directly on the Web will increase from approximately $27.0 billion in 1998 to approximately $842.7 billion by 2003.

One of the factors slowing the wider deployment of the Internet is that it requires an expertise level which is still quite high. Today's computers are difficult to use and require significant levels of expertise, generally built over many years of computer use. Also, non-computer users are quite often intimidated by the technology of computers. Current Internet products require that their users have a certain level of familiarity with a computer, the medium, its language, and its unspoken rules. This trend is becoming more entrenched with each new advance in technology, since technology is being used to substitute for human interaction between the Web site and its users.

This combination of factors results in more than half of the world population bewildered, uninterested in using and enjoying one of the best technologies developed in the twentieth century. The general population is being excluded from the Internet because it requires them to understand computers and learn computer skills and technological language. Moreover, to use the Internet, users have to pay more for a personal computer, Internet connections and related requirements, than for a television set. In addition, there is a natural, human fear of failure when challenged to master new skills. This group excluded from the Internet represents every segment of the general population—men and women, young and old, professionals and non-professionals.

The Internet is a large network made up of a number of smaller networks. It is made up of more than 100,000 interconnected networks in over 100 countries, comprised of commercial, academic and government networks. It has become commercialized into a worldwide information highway and data base, containing information on every subject known to humankind.

Thus, the Internet and its World Wide Web ("WWW" or "Web") system have become an important means of providing access for many users to vast amounts of information stored on the servers which make up the Internet. By way of background, the WWW is an Internet facility that links documents locally and remotely. The Web document is called a Web page, and links in the page let users jump from one page to another page (hyperlink) whether the pages are stored on the same server or on servers around the world. The pages are accessed and read via a Web browser such as Netscape Navigator or Microsoft Internet Explorer.

The WWW has become the center of Internet activity since, among other reasons, Web pages, containing text, graphics, audio and video are easily accessible via a standard web browser. The WWW contains the largest collection of online information in the world, and the amount of information is increasing. Current schemes for accessing a Web document require typing in the URL (Uniform Resource Locator) address of the home page in the Web browser. From there, the user starts surfing through the Internet via hypertext links to other documents that can be stored on the same server or on a server anywhere in the world.

The fundamental Web format is a text document embedded with "HTML" tags that provide the formatting of the page as well as the hypertext links (URLs) to other pages. HTML codes are common alphanumeric characters that can be typed with any text editor or word processor. Numerous Web publishing programs provide a graphical interface for Web page creation and automatically generate the codes. Many word processors and publishing programs also export their existing documents to the HTML format. Thus, Web pages can be created by users without learning any voluminous coding system. The ease of page creation has helped fuel the Web's growth. Web pages are maintained at Web sites, which are computers or nodes that support the Web's HTTP protocol. The HTTP (Hyper Text Transport Protocol) is a communications protocol used to connect clients (for example, personal computers) to Web sites.

To date, the majority of users are people with technical or professional backgrounds who use expensive personal computers or work stations to access the Internet and the WWW. In order to increase usage and acceptance of the Internet and WWW by the public, it is necessary to provide systems which are less expensive and easier to use than personal computers or the existing Internet access devices.

The proper and efficient use of the great amount of information and services available on the Internet has the potential of providing Internet users with an environment in which to attend to all their needs and wants. In particular, those non-technical users interested in certain segments of the information and services available on the Internet could benefit tremendously from having their specific information or services of interest available to them without much of a searching effort. Moreover, such users would benefit greatly from being constantly and automatically updated on new information and services as they become available.

The shear size of the information available on the Internet and the Web has made it a necessity for users to efficiently and constantly sift through the available information in order to find and organize the information that is of interest to them. Stated differently, users realize that the availability of information itself is not useful unless the information is reduced to a manageable size and unless the information so reduced in size is of interest and of value to the specific user. According to IDC, the number of web pages will increase from approximately 925 million at the end of 1998 to over 13 billion by the end of 2003, representing a compound annual growth rate of 70%.

To date, the following strategies have been developed to assist Internet users:

Internet Directories. Internet directories generally list web sites by specific topics of interest and contain links to these sites. With the rapid growth of content available on the Internet, these directories are becoming increasingly difficult to build and update with a high level of quality. In addition, the creators of these directories often have limited relevant knowledge about the directories' particular topic areas.

Internet Search Engines. Internet search engines capture, store and index web site information in order to retrieve web site listings in response to user query. These software programs have a limited ability to determine the quality or relevance of the web sites they retrieve. Further, as the nature of the available content has become more difficult to classify, many companies offering search engines are being forced to employ significant editorial staffs to ensure that responses to queries are satisfactory. Search engines based on natural language have the added difficulty of accurately determining sentence syntax and nuances.

Internet Portals. Many traditional Internet directories and search engines have added interactive tools and features, such as weather, news feeds, stock portfolios, personal home pages, and non-proprietary content from other media. These portals provide Internet users with basic information and links on a broad range of topics. Because most portals have many similar tools and features and provide limited original content, there is little differentiation among them.

Topic-Specific Sites. More in-depth content is generally found on sites focused on particular topics where individuals knowledgeable about those topics create the content. Because these sites tend to be widely dispersed, Internet users may need to visit a number of other unaffiliated sites in order to satisfy their information needs.

User-Generated Content Sites. Many web sites generate and contribute relevant content. However, the quality of this content varies significantly and the content is frequently un-managed and poorly organized and presented. As a result, advertisers may be reluctant to entrust their brands to sites that rely upon user-generated content.

Various "search engines", such as Yahoo, Excite, Lycos, and AltaVista, among others, are known that permit a user to search for specific information. However, such search engines must be used on a daily basis to ensure that the updated information is accessed. Moreover, almost any search string results in a huge number of documents and the user would not know which documents have already been ruled out as being of no interest. Further, the search engines generally do not focus on particular sites that are of interest to the user; they search the entire Internet. The Internet is huge and complex. This is especially daunting to non-technical users who are unschooled in the vagaries of search techniques. The virtual environment object of this invention develops a better, more powerful and intuitive search engine based on semantic and cognitive profiling to allow for improved information retrieval on the Internet by non-technical users. The same Artificial Intelligence driven semantic engine that determines the meaning of user requests can be turned around and used to interpret the validity of query results that answer requests. Additionally data structures that support and store user oriented semantic relationships provide a readily accessible "web of knowledge".

Since commerce is an inherent activity of human beings and an obvious part of life as we know it, it behooves us to develop a largely friction free mass commerce potential to get buyers and sellers together in a productive and mutually fulfilling experience. In order to do this, ways must be developed to reduce or remove the real or perceived barriers to commerce on the buyer's side such as high pricing, return hassles, credit card concerns, privacy protection, navigational difficulties and delayed gratification. On the sellers' side ways of dealing effectively with payment matters, the cost of customer service, inventory control costs, including the cost of goods sold and a full range of other business to customer and business-to-business concerns need to be adopted. In addition, strong models to help businesses and consumers deal effectively with business management issues that add to supplier costs must be developed.

None of the devices or methods available in the prior art, however, provides a way of integrating all available technologies together in order to provide a user friendly virtual environment which provides the user with an easy to use technological solution while at the same time taking advantage several available technologies. Thus, there is a need for a virtual environment and method of creating said environment which overcomes these and other deficiencies in the prior art.

SUMMARY OF THE INVENTION

It is therefore an object of the present invention to fulfill the real potential of the Internet as a mass medium in a Post-PC Environment that takes control of its users' experience before, during, and after their initial connection by meeting and anticipating their individual information, services, entertainment, and transactional needs in real life scenarios through technology that recreates everyday situations.

This invention will create a dynamic virtual reality environment based on user's individualized personality, interests or needs using an artificial intelligence engine's experience with the individual user of the invention.

It is a further object of this invention to humanize information technology by making the technology truly easy to use, accessible, affordable, and relevant in people's everyday lives while bypassing the requirements of computer literacy and ownership, deliver entertainment, current, and relevant information, and useful services and merchandise on demand in a manner that accurately reflects each user's reality at many levels. The virtual environment of the present invention, respects users desire for privacy, as the user only interacts with a set-top box and not with retailers or service providers. The environment interacts with and responds to users both individually and as a group, learns, evolves and changes quickly in response to user demands and preferences.

It is another object of the present invention to provide simplified non-technical, and genuinely user friendly multimedia authoring and editing tools tailored to deliver content that effectively utilizes the virtual environment's front end and supports a large array of content input sources such as subject matter experts, free lance writers, staff writer/reporters, graphic, video and audio artists.

The virtual environment is to engage users from all walks of life by using their chosen natural, non-technical language at personal and individual level. To accomplish this, the environment will use advanced Artificial Intelligence driven semantic processing, voice recognition, and digital and audio technology to create a unique environment that provides verbal, natural language, intuitive and friendly navigational aides and online/offline human quality support.

The virtual environment of this invention is intended to be a global, interactive "mass medium". The environment provides appropriate user services "on-demand" not following that ubiquitous tendency for technology to develop one size fits all approaches.

Every component in the virtual environment of this invention has the capability to dynamically learn, change, and respond quickly according to individual needs and desires by building dense user profiles. At the same time, user profiles should be absolutely secure and guarded against inappropriate access or use in conformance to user desires and the varying laws on privacy from jurisdiction to jurisdiction. This is an all-important feature. Not only is the security of profile information required by law in an increasing number of jurisdictions, but the lack of trust by users on how their profiles are handled is a primary reason vast numbers of potential users shun online activities. The virtual environment of this invention guarantees privacy protection.

A primary feature of the virtual environment of this invention is that it should, to the possible extent, make the technology disappear. Currently, users must directly deal with three artifacts of technology—operating systems, user interfaces and browsers—before they even get to deal with applications that could possibly affect their lives. Today's operating system/user interface/browser combinations are not truly intuitive nor user friendly. This invention provides a new non-technical and natural integrated user interface/browser based on a totally transparent and stable real time operating system. This innovative "front end" is housed in a set-top box, which provides interaction and access using the user's television and telephone. In other embodiments of this invention this front end may be modularly constructed to reside in any other user devices that provide appropriate access to the virtual environment.

The system of this invention quickly goes online when commanded without additional user interaction. The user does not need to be involved in any operating system derived technical setup routines. In this invention there is no chance for the loss of user information and the user is continually apprized of the progress in real time of all submitted requests.

The environment of this invention provides intelligent, efficient and non-patronizing means to deliver marketing, promotion, and merchandising services as a natural and unobtrusive part of the users online experience. There is a tendency for the online world to become over infatuated with mercantile e-commerce as the primary driving force in the online experience. In life as we know it, shopping and entertainment are not the only thing that we do. We need to work productively to be able to shop and be entertained as well as fulfill our sense of accomplishment. We seek communications and relationships with the community at large in order to share a common experience and social bonding. People over time will not become loyal, persistent users of a medium that just tries to sell them something all the time.

The environment of this invention brings out of the user experience strong models of local community development that can be used to help people actually lead what they perceive as better and more fulfilling lives. Among those models are ones to facilitate high quality, user oriented healthcare, expand the quality and availability of education at all levels, help local people make a living thereby expanding local community options, support community activism and participation and increasing the general level of understanding between individuals and communities. By facilitating these types of activities, the environment of this invention will support electronic commerce as a necessary by product.

A further object of this invention is to attract and satisfy the vast majority of the population that does not use the Internet. Conventional Internet companies set-up shop and wait in the sidelines hoping to capture a share of the "inevitable" market explosion. This invention develops a mass medium by pulling the Internet outside of computers and into television sets, and inviting people to use it as a medium that leads them to a friendly and human virtual environment that delivers all of the services that the users desire and need.

This invention tackles all of the aforementioned issues by providing a full service affordable package to enable those who previously were daunted by the perceived high financial and intellectual costs of joining the Internet Age. The technological dominance of the Internet industry has led to a critical miscalculation—the belief that the consumer must adapt to technology. This obvious mistake permeates the thinking of current Internet companies, including the most successful. This invention fills this void by serving the consumer by technology, not vice versa, by using and adapting those technologies which provide a satisfying and value-adding experience to its users who do not have to adapt to the invention.

A further object of this invention is to offer and create individual virtual environments for each user in order to meet their specific needs and wants. A user's nationality, language preference and gender are only a start. The virtual environment will meet the needs of the user in ease of use, richness of content offerings, attractiveness in e-commerce availability, and any other unmet need the user might express.

The virtual environment of the present invention also provides simple processes to conduct electronic commercial and non-commercial transactions and continued customer support before, during, and after each transaction.

In the Post-PC Era, while there is a relatively small universe of households with computers and Internet access, 95% of households around the world own television sets. Thus, most people may be connected instantly to the virtual environment object of this invention, where the mouse, the keyboard and the PC monitor are replaced by their television and telephone sets.

Connecting to the virtual environment does not require a PC. The user only has to install the set-top box and turn it "On" to enter the virtual environment. The direct connection between the user and the virtual environment is totally seamless as it bypasses the confusion of learning "to surf." Users are directed to an "all inclusive" virtual environment as their first point of contact. Navigation and communication with the virtual environment is through humanized mechanisms, such as speech recognition.

The virtual environment object of this invention will relate to its users as individuals in real, human, everyday language, delivered through two familiar household items—the television and the telephone. This will revolutionize today's Internet and television, bypassing computers, to deliver information, entertainment and commerce to its users interactively and on a one-to-one basis, realizing for the first time the all-inclusive potential of the new medium.

Recent market research, such as the study conducted in 1999 by Roper Starch Worldwide, reveals that consumers are willing to rely on the new medium to satisfy a growing range of their communications, information, entertainment, and business needs, and consider it an important part of their lives. According to the study, conducted via telephone in July 1999, among a random sample of approximately 1,000 home Internet subscribers over 18 years of age, electronic commerce is the fastest growing online activity, with a 10% jump over the previous year. The Roper Study also illustrates the limited vision of today's Internet—one question asked of the respondents was "If you are stranded on a desert island, would you prefer to have a television and telephone or a PC with an Internet connection?" The respondents, presented this false choice, selected an interactive connection. However, the all-inclusive environment of this invention obliterates this false dilemma—through a set-top box and environment which provides its users with the interactivity they crave through household devices they are familiar with, bypassing the perceived PC gauntlet.

It is also an object of the present invention to offer highly-competitive pricing for all merchandise sold within the environment by obtaining volume discount from retailers, wholesalers, and manufacturers. By creating an environment that removes the mass market's perceived barriers to electronic commerce, a high-volume consumer audience that will be attractive to vendors will be created. Vendors will seek to sell their goods and services in the virtual environment. Commercial affiliates and service providers may take orders from users of the virtual environment, which will be executed by the operator of the environment. Through volume, said operator will be able to negotiate favorable financial terms for its members.

The technological infrastructure will learn from customer interaction and immediately alert a customer service department of problem areas and provide performance reports of content of the virtual environment. Twenty four hour online and offline customer service and support may facilitate all aspects of the customer experience, from Internet connection to electronic commerce.

Video, audio and Speech-Recognition components interact with users of the environment in a human, personal and individual manner.

An important object of this invention is to provide the user with a virtual intelligent assistant which adapts to each user and offers a high quality of individualized user interaction.

Because current Internet products require that their users have a certain level of familiarity with the medium, its language and its unspoken rules, they all cater to the same audience while excluding new users. It is an object of the present invention to fill this vacuum, to entice and maintain non Internet users with a virtual environment that delivers content that satisfies the following requirements:

Presented in an intelligent, imaginative, attractive manner using real human language.

Edited for accuracy, timeliness, and completeness.

Filtered and edited by an Artificial Intelligence technology according to each customer's individual needs and preferences before it is published in the virtual environment.

Organized and catalogued by an Artificial Intelligence technology in order to present the proper possible number of relevant choices to each user.

Where marketing and promotions are introduced in an intelligent, non patronizing way as a natural part of each user's experience, through recommendations, suggestions and other means.

The virtual environment of this invention appeals to the general population because it relies on a personal human and non-technological relationship to satisfy individual needs and preferences.

An embodiment of the present invention provides a Post-PC era revenue model that eschews the current Internet advertising sales strategies by offering retailers and Internet service providers the opportunity to sell their products to a mass audience in a virtual shopping zone.

Another object of the present invention is to maximize marketing revenue while providing users a clean, uncluttered content.

Still another object of the present invention is to offer an attractive approach which would increase the size of the audience and the length of their visits. Thus, increasing the traffic in the virtual shopping zone allowing the host to set higher prices for the retail space of the Shopping Zone and realizing higher sales fees.

Offer retailers, manufactures, and service providers an opportunity to create their own merchandising and marketing presence within a virtual shopping environment, charging such companies a fee for the preparation of their marketing area, with cost dependent upon the complexity of the area and the prominence of its location within the environment.

Retail space may be leased at a monthly fee.

Long-term contracts may be designed to support broad marketing objectives, including brand promotion, awareness, product introductions, online research and the integration of marketing messages with editorial content.

The virtual environment itself, both as to its construction and its mode of operation, will be best understood, and additional objects and advantages thereof will become apparent, by the following detailed description of a preferred embodiment taken in conjunction with the accompanying drawings.

When the word "invention" is used in this specification, the word "invention" includes "inventions", that is, the plural of "invention". By stating "invention", the Applicant does not in any way admit that the present application does not include more than one patentably and non-obviously distinct invention, and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious one with respect to the other.

BRIEF DESCRIPTION OF THE DRAWINGS

FIG. 1, is a block diagram of an embodiment of the set-top box, VCR, and cable decryption box interface, case 1.

FIG. 2, is a block diagram of an embodiment of the set-top box, VCR, and cable decryption box interface case 2.

FIG. 3, is a block diagram of an embodiment of the set-top box, VCR, and cable decryption box interface case 3.

FIG. 4, is a block diagram of an embodiment of the set-top box, VCR, and cable decryption box interface case 4a.

FIG. 5, is a block diagram of an embodiment of the set-top box, VCR, and cable decryption box interface case 4b.

FIG. 6, is a block diagram of an embodiment of the set-top box, VCR, and cable decryption box interface case 4c.

FIG. 7A, is a top level block diagram for an Artificial Intelligence System.

FIG. 7B, is a mid level block diagram for an Artificial Intelligence System.

FIG. 8, is a block diagram for the Intelligence Center of the Invention.

FIG. 9, is a block diagram of all likely features of the set-top box.

FIG. 10, is a block diagram of a suggested assignment of functions to DTMF keypad.

FIG. 11, is a block diagram of all likely features of the set-top box.

FIG. 12, is a block diagram of all likely features of the set-top box.

FIG. 13, is a block diagram of the preferred configuration of the set-top box.

FIG. 14, is a block diagram of the voice remote control operation.

FIG. 15, is a block diagram of the preferred embodiment of the voice remote control operation.

FIG. 18, is a block diagram of the Set top Device.

DESCRIPTION OF THE PREFERRED EMBODIMENT

Figure 16:
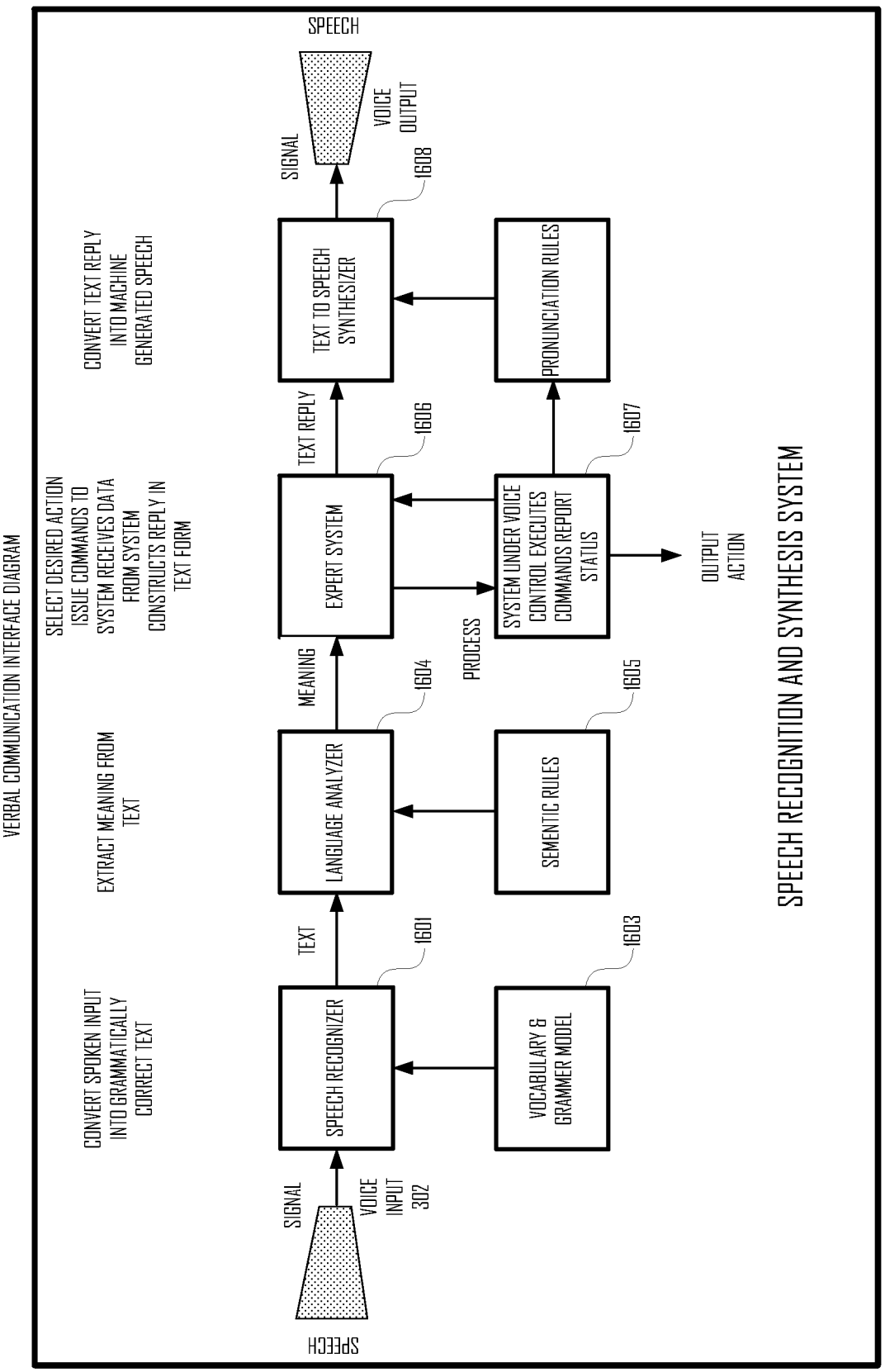
FIG. 16, is a block diagram of the Verbal Communication Interface Program.
Figure 17:
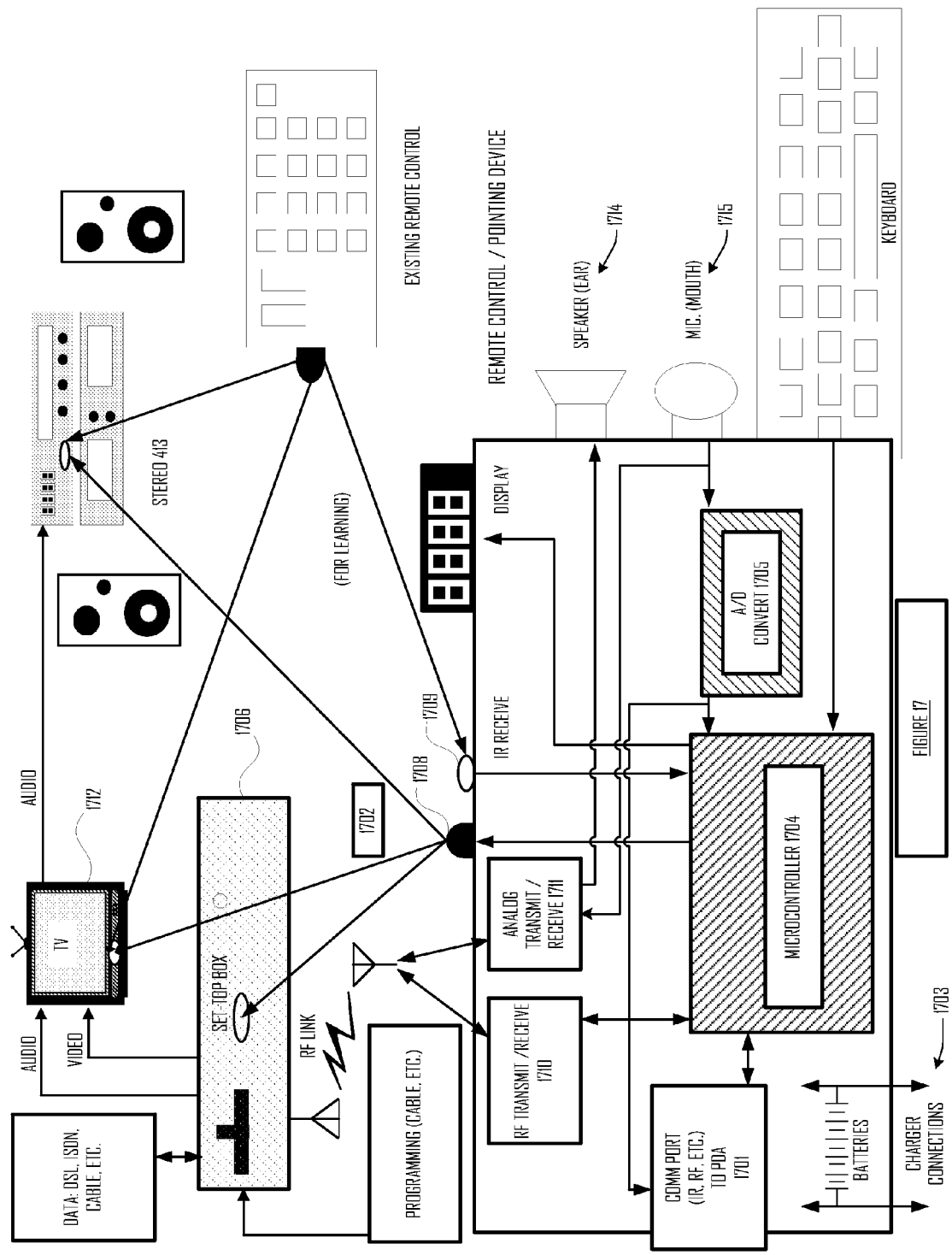
FIG. 17, is a block diagram of the Remote Control and Set-top box interface.

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

I. The Virtual Reality Environment

By incorporating new applications of Artificial Intelligence, speech recognition, and digital video and audio technologies, this invention creates a unique virtual environment that provides verbal, natural language, intuitive, and friendly navigational aides and online/offline human support to deliver the most relevant, useful and current information and entertainment options, and the most efficient means to conduct the widest possible range of commercial and non-commercial transactions—from shopping to banking and filing official documents and every other of the users lifestyle needs. This virtual environment may engage consumers from all walks of life in real, human, non-technological language at the most personal and individual levels. Every component in the virtual environment learns, responds, and changes quickly according to the needs of each individual user, interacts with users through video and audio technologies in natural language, and is designed for smooth and fast scalability.

The virtual environment of this invention encompasses three separate elements: a set-top box FIG. 11 and a voice equipped remote controller, FIG. 11, 1101, which provide a very friendly user interface to the system, TV and or PC, and a group of computer servers as the back-end to support all services available from the set-top box. These services may include, among others, home banking, e-commerce, e-services, education, entertainment, voice over IP, and video over IP. In addition, hardware and software infrastructure is required for supporting the above components, e.g. connectivity means (telephone lines, cables, DSL, satellite, etc.) and Application Service Provider (ASP).

The virtual environment of this invention takes the Internet out of the PC environment and into the users television sets, through a small and easy-to-use set-top box. The set-top box uses televisions and telephone lines to instantly connect users with the environment. Installation and connection of these devices is a quick and simple process. In addition, in another embodiment of the invention, circuit boards, which serve the function of the set-top boxes, may be incorporated in television sets. The users of the present invention may access the aforementioned services via a natural and friendly form of human communication with the familiar medium of television, and traditional remote controls. In this way, people without computer knowledge will be able to "surf" the Internet and enjoy the vast array of services offered by current advanced technologies without encountering any technical barriers.

The set-top box provides the user with a satisfying and simple to understand experience by transparently taking care of the technical details of the communications interface with television sets and telephone lines to instantly connect people to the virtual environment and allowing familiar paradigms and natural-feeling controls to replace the arcane, un-intuitive, and awkward ones used by other Internet products. In another embodiment of the invention, circuit board's are pre-installed on PC's. Still in other embodiments of the invention, circuit boards are pre-installed in DVDs and VCRs.

The remote controller extends the functionality of the system by allowing the user familiar with TV remote-controls and wireless telephones to engage in Internet activities in an intuitive way, and without learning a daunting amount of new jargon and methods.

Through the use of the present invention, the Internet in the Post-PC Era will be a vehicle that transports people to destinations that enhance their lives and entertain them in ways that existing media cannot. The present invention enables people to access the Internet without the need of computers and/or computer knowledge. Thus, enabling them to use the Internet for what it truly is—a medium that connects people with the virtual environment object of this invention. This virtual environment empowers the users with true choices and one-on-one interactivity, beyond the limitations of time, space and programming inherent to both traditional media and today's Internet.

This invention will anticipate and meet all of the user's lifestyle needs in a friendly and efficient way within a virtual environment that emulates the world as the user knows it. As technology and the communications infrastructure have evolved, the time has come for television, radio, print, and the Internet to meet in a multidimensional and Post-PC virtual environment that offers, through connectivity and interactivity, individualized information, entertainment, and communication options.

II. Host and Personal Assistant

Making reference to FIGS. 7A, and 7B, the present invention provides an artificial intelligence engine 701 to guide and assist the user of the virtual environment. In its preferred embodiment, the invention's intelligent assistant is represented by an animated character or avatar having human-like features and gestures. The character can communicate back to the user through text, voice, and its own animated gestures 702. The invention's intelligent assistant automatically and constantly collects information of interest to the user in order to create a user profile 703.

Users are introduced to the virtual environment by a human host who will be a trusted, real-life person presented through digital video and audio technologies that will emulate human interaction powered by Artificial Intelligence and Speech-Recognition technologies 704.

The host's task is to put the new user at ease by creating an atmosphere of trust and respect, determine the user's level of Internet and computer expertise, and gather basic personal data through a friendly and brief conversation before turning the user over to a virtual character or avatar who will be the user's personal, discrete and unobtrusive personal assistant in the virtual environment.

This initial encounter provides the basic information necessary to shape the personalized virtual environment that will be delivered to each user. The interaction between the assistant and the user is more intense at the beginning for new Internet users in order to gather all of the necessary information to configure the virtual environment, and less intense for intermediate and experienced users who do not want or need assistance in the personalization process. The complete process of personalization should generally be completed within 180 days.

The assistant 702 is an imaginary virtual character or avatar whose duties are the following:

Determine the look and feel of the virtual environment for each individual user.

Determine the entertainment, informational, and transactional needs for each individual user.

Guide and assist users as they learn to use and enjoy the virtual environment.

Monitor the user's activity in the environment to anticipate and respond to new needs and changing preferences.

Introduce new features and services that fit the individual user's profile.

The Artificial Intelligence engine that powers the Host and the Assistant, will continually monitor the user's activities and gather the data that will guide the continued production and delivery of the virtual environment, and maximize the revenue potential through the environment's commerce, maintenance and subscription services. Moreover, the Artificial Intelligence engine enables the assistant or avatar to create and maintain a user profile. The intelligent assistant or avatar alerts the user of products or services which he or she may be interested in based on the user's profile.

In the preferred embodiment, the intelligent assistant is portrayed as an animated character with human-like features. Other embodiments may use any animated characters through the use of any graphic image. The intelligent assistant incorporates the core technology of artificial intelligence. In the preferred embodiment, the intelligent assistant exhibits human-like intelligence and behavior including cognitive reasoning, voice recognition, ability to learn or adapt through experience, pattern recognition, and natural language understanding.

The intelligent assistant is able to carry out its actions based on its prior experience with the user. Thus, the intelligent assistant not only performs the above mentioned tasks but also provides a human-like personality.

The user may communicate with the intelligent assistant via any of several input sources, including a speech recognition device (a microphone or wireless headset provides input to the speech recognition device). The user can issue commands to or communicate with the intelligent assistant by voice commands entered via the microphone which provides input to the speech recognition device FIG. 18, 1803. The speech recognition device is used to provide input to the invention's intelligent assistant by converting spoken words into text. Speech is converted into text as if the words were typed on a keyboard. In the preferred embodiment, the speech recognition device used to provide input to the intelligent assistant can recognize all types of vocabularies such as numeric digits, words, and phrases.

The intelligent assistant can respond to or communicate with the user in three different ways. The intelligent assistant can respond to the user through text. The intelligent assistant can display text on the TV screen 1807.

In the preferred embodiment of this invention, the intelligent assistant communicates through speech via a speech synthesis device 1805. The speech synthesis device generates machine voice by arranging phonemes into words. The speech synthesis device is used to turn text into spoken words. To achieve this task, the speech synthesis device performs real time conversion without a pre-defined vocabulary.

Referring to FIG. 16, the speech synthesis device feeds from an expert system, providing outputs to a speaker through the speech synthesis device. The invention's intelligent assistant utilizes a standard audio device connected to the system. As the third form of communication, the intelligent assistant may communicate with the user through animation or gesture.

The assistant provides information and help to the user. The assistant behaviors are sensitive to the history of user behavior.

In a preferred embodiment of this invention the assistant integrates data from several sources. The assistant accepts direct interactions from the user as well as using the history of previous user behavior stored in a user profile 703. In a preferred embodiment, these inputs allow individualization of assistant interaction. Alternative embodiments are responsive to additional data types and sources. In a preferred embodiment of this invention the diverse assistant behaviors adapt to the user based on a variety of information about the user. The assistant modifies its behavior on the basis of a growing history of interactions with the user over time, as this history of user behavior is stored in the user profile database.

The adaptation of the assistant to the user emerges from the assistant's updating of data in the user profile database. In the preferred embodiment, the assistant's knowledge of the user is represented by data in the user profile database, in particular in the user cognitive model, which stores general materials and independent data describing how the user behaves. As the user interacts with the virtual environment, the assistant receives information regarding the user's preferences. The assistant updates the user profile database with data from these interactions. As this data is updated, the assistant adapts to the user, and thereby individualizes to the user. This adaptation is maintained across sessions with this user.

In the preferred embodiment, the data updated by the assistant gives more weight to recent than past behavior. In addition, the assistant tries to anticipate future behavior.

III. Artificial Intelligence Engine

The virtual environment of this invention is based on cutting-edge technologies particularly powered by Artificial Intelligence and speech recognition. The Artificial Intelligence engine is the centerpiece of the environment. The engine combines the strength of natural-language parsing software, speech recognition technology, digital video and audio software, data mining processes, knowledge-based, and expert systems. Combined with the capabilities of human editors and customer service representatives, the engine may anticipate and fulfill all of the users' on-line needs by pro-actively pushing choices based on preferences not on past behavior. Through this engine, the virtual environment is able to deliver the defined services, information, and assistance its users want and need in a simple non-technical manner. The environment appeals to the general population because it relies on a personal human and non-technological relationship to satisfy individual needs and preferences.

IV. Life in the Virtual Environment Post-PC Era: Content Solution/Services that could be Provided Content can take many shapes—text, audio, video, graphics, among others—and it can be delivered in any number of ways, but it is the critical element to attracting a significant number of people to an environment not just one time, or once in a while, but every day and even many times a day. However, a disorganized proliferation of content only adds to the frustration of new Internet users as they struggle to master an unfriendly medium that does not even speak their own language.

There are five principal content areas in the preferred embodiment of the virtual environment object of this invention—"Entertainment," "News," "Education," "Personal Growth," and "Business or Professional Growth", divided by market segment and topical categories, as shown in the following table. Many more content areas may be available in other embodiments of the invention. For instance, the following table presents one embodiment of possible contents areas of the virtual environment of this invention. Many other combinations are possible and fall within the scope of this invention.

| Content Areas | | |
| --- | --- | --- |
| MEN | WOMEN | CHILDREN |
| PROFESSIONAL SPORTS COLLEGE SPORTS AUTO/ BOAT ELECTRONICS LEISURE SPORTS (GOLF, TENNIS, HUNTING.) CONSUMER PRODUCT REVIEWS | FASHION/BEAUTY MOTHERHOOD/CHILD DEVELOPMENT HOME/DECORATION ROMANCE HEALTH/FITNESS SCHOOL DIRECTORY SUMMER CAMP DAYCARE & AFTER SCHOOL DIRECTORY LEISURE ACTIVITIES HOROSCOPE CONSUMER PRODUCT REVIEWS | (3-12 YRS OLD) HOME AND SCHOOL PROJECTS/ IDEAS/GAMES/ NEW TOYS KID PAGES CONSUMER PRODUCT REVIEWS |
| TEENAGERS | BUSINESS | PARTY PLANNING |
| FAN CLUBS MUSIC TV/MOVIES FASHION/BEAUTY CYBER GAMES SPORTS ROMANCE TEEN PAGES SWAP BOARDS HOROSCOPE | TOP NEWS INTERNET NEWS OPINION/ANALYSIS THE MARKETS MOVERS & SHAKERS ENTREPRENEURS & SMALL BUSINESS BUSINESS AGENDA PERSONAL FINANCE CAREER CENTER | BABY CHILDREN TEEN THEME SPECIAL OCCASION WEDDINGS CORPORATE CONSUMER PRODUCT |

-continued

| Content Areas | | |
|---|---|---|
| | CONSUMER PRODUCT REVIEWS | REVIEWS |
| TRAVEL/TOURISM | ARTS & ENTERTAINMENT | POLITICS |
| DIRECTORIES EVENTS TRAVEL PLANNING SERVICES VIRTUAL VACATIONS | SCHEDULES REVIEWS TICKETING SERVICES SPECIAL EVENTS | LOCAL NATIONAL |
| DAILY NEWS | CHURCH/RELIGIOUS | PETS/MASCOTS |
| LOCAL NATIONAL INTERNATIONAL SPORTS | LOCAL NATIONAL SCHEDULES ACTIVITIES | CARE HEALTH GENERAL ADVICE VET/GROOMING SERVICES CONSUMER PRODUCT REVIEWS |
| SENIOR CITIZENS | PHYSICALLY CHALLENGED | |
| HEALTH RESOURCES PERSONAL GROWTH | RESOURCES HEALTH PERSONAL GROWTH | |

Content may include original articles, professional and commercial directories, as well as material generated through any of the following information sources:
  Existing Web Sites
  News Wires and Services
  Subject Matter Experts
  Writers/Reporters
  Community, Professional, Civic, Religious Organizations and Associations
  Civic/Religious/Cultural Organizations and Associations
  Professional and Amateur Sports Organizations and Associations
  Local Clubs In the preferred embodiment, national and local celebrities may be recruited as spokespersons or as hosts/presenters of the virtual environment. In addition, content may be continually refreshed by adding information, product, content, and services in response to consumer demand.

In the preferred embodiment, production and presentation for each content area is performed by an editorial staff composed of:
  Editors/Coordinators. Responsible for coordinating the production of material from all information sources, as well as editing and filtering it for users.
  Writers/Reporters. (Includes video/audio/photo/graphic material). Responsible for producing material according to editors/coordinators guidelines.
  Graphic Artists. Responsible for the visual presentation of content, according to editors/coordinators guidelines.
  Programmers. Responsible for developing/maintaining interactivity between the virtual environment and its users. Are also responsible for developing and maintaining content production and delivery tools.

Some of the services that may provided by the virtual environment can be categorized as follows:

Services provided by Application servers. Services in this category are provided through the Internet. The virtual environment of this invention can organize the contents of the service and deliver them to the users.

Basic Information Services. The information is current, not repeated and the content is customized according to a user's preferences.

Any general and some special services may be customized according to customer needs.

Home banking. Through its set-top box, The environment of this invention provides secure connections to commercial banks, enabling customers to transfer money between bank accounts, determine payment schedules, complete credit card and loan applications, purchase certificates of deposit and other investment products, safely pay bills, review statement activity, make loan repayments, buy insurance, access up-to-date account information and so on.

E-commerce. The environment of this invention provides a convenient and competitive way of shopping at home. A customer can make a purchase at a retail space on the virtual environment. A secure transaction is paramount. Competitive prices, buying suggestions, and consumer product reports will attract users. The virtual environment can be an excellent shopping assistant and companion.

The environment contains a customer management system which manages users' profiles and preferences information enabling the delivery of customized content based on the user's preferences, and supports promotions and one-to-one marketing. The system provides the service of direct e-mail marketing campaigns based on subscriber profiles and preferences.

The Artificial Intelligence engine provides many functions such as Voice Recognition, personal preference analysis and so on. The knowledge-based database contains some domain knowledge and expertise supporting research, inference and expert systems, such as any E-service. A database contains the data of the virtual environment.

Customer monitoring and customer feedback means, enable the system to monitor a user's actions to the system and analyze user's behavior and provide personal preference information to the Customer Management System. The tool can process user's feedback timely and adjust the system services accordingly.

Video over IP: (Needs digital video camera) Provides video conference service.

Internet conference: offering one-to-one and one-to-many Internet conversation, such as chat rooms.

Web-casting: announcement, and distribution of software updates.

V. Examples of Uses of the Invention

A. Home Banking. In one embodiment of the invention, a home banking service may be provided through the environment of the invention. The home bank of said embodiment may include the following servers:

A browser or a conversation user interface (UI): The interface that customers launch the home banking service from front-end client program.

A Proxy server: The proxy server with a security server provides security connection to void web attacks.

A web server: The web server interprets customer requests from a web browser.

Application server: The application server provides application specific program to process customer requests.

Bank server: The bank server provides the banking services listed above.

A home banking transaction in the environment of the invention typically has the following steps:

1. The customer requests a bank service by using the browser or the conversation UI.
2. The set-top box opens a secure session with the proxy server and a security server by using SSL cryptography standard.
3. The proxy server will open an SSL session with the application server.
4. The customer makes a request to run the banking application.
5. The request is encrypted and forwarded over the digital network to the proxy and security server.
6. The request is authenticated, re-encrypted, and forwarded to the application server.
7. The application server requests a service from the bank server and sends the encrypted information back to the proxy server and security server.
8. The proxy and security servers decrypt the application, signs using system's digital certificate, and then send the encrypted information back to the set-top box.
9. The set-top box decrypted the information and opens a direct SSL connection to the bank server.
10. The bank server retrieves the requested financial information from the local database and responds by sending the private data back to the set-top box.
11. The set-top box interprets the requested data and talks to the user and/or displays it on the television set or other appropriate output mode.

B. E-commerce (encrypted credit card payments). The credit card details are encrypted when a user of the environment submits the information into the set-top e-commerce application. The details are then sent from the subscriber to the particular merchant as an encrypted message.

E-commerce transactions may include the following servers:

A browser or conversation user interface: to launch the set-top's e-commerce application.

E-conamerce applications: Provide a catalog containing text and multimedia information on every merchant. A user navigates the catalog of items and decides to order a particular item.

E-commerce application for conversation: To analyze the user's need and find a merchant either through an outside E-commerce server interactively or through the virtual environment directly.

A merchant server: Processes purchase requests and returns a summary of the order to the set-top box.

A transaction server: A transaction server at the financial institution that processed the transaction request.

A database server: A database server provides database access capability requested by the transaction server for credit card accounts of the customer.

Outside server: for credit card information.

Accounting and inventory system: records purchase information and arranges the delivery of the merchant.

Verbal E-commerce interface provides shopping information through voice communication.

A typical E-commerce transaction in the environment of this invention includes the following steps:

1. The customer launches the set-top box' e-commerce application (connecting to a merchant server);
2. The merchant server provides a catalog containing text and multimedia information on all available merchandise;
3. The customer navigates the catalog of items and decides to order a particular item; or the verbal E-commerce interfaces talks with the customer and analyzes the customer's need and finds a merchant either through an outside E-commerce server interactively or through the virtual environment directly;
4. The set-top box establishes an SSL connection with the merchant's server;
5. The customer initiates the purchase process by providing payment and shipping information;
6. The merchant server receives the purchase request and returns a summary of the order to the set-top box;
7. Details of the order, including price, credit card number, shipping address, and order number are displayed on the television set or other output medium;
8. The customer verifies the information and confirms the order back to the merchant server;
9. The merchant server repacks the related customer information without the order details by encryption and sends it to a financial institution;
10. The transaction server at the financial institution receives the request and processes it;
11. A database server accessed by the transaction server will access a database of the credit card accounts of the customer;
12. If the financial institution doesn't have direct access to a credit card database, it may send the information on to another institution or banking network, such as Visa;
13. The bank's database server then sends a request to the credit card database to debit the customer's account;
14. Similarly, it sends a request to its own customer account database to credit the merchant store's account with the relevant amount;
15. Once the financial transactions are completed, information of an approval or denial returns to the server;
16. Provided the user's details are correct, the merchant server will activate the other business processes such as inventory, accounting and fulfillment;
17. The merchandise is delivered.

C. Education. All areas of education including primary, secondary and third level education will be moving into a new dimension in the future (Supported cable, terrestrial, satellite and MMDS). The education needs of the environment of the invention encompasses the following components:

The Set-top box' educational application (a browser or a resident program): creates virtual classrooms, so students in different schools interact and learn as they where in the same classroom.

A database server: stores the various educational programs.

A broadcast server: Manages and injects the requested data into the MPEG video system.

D. Entertainment. For example, playing games. Using a standard set-top box and a remote control, a user can play a given game. There are three primary system components that may be used for supporting set-top gaming.

Broadcast server: This server is responsible for injecting or inserting the gaming application into the digital MPEG-2 transport system.

Games application server: This server is used to store the programming code of the various games that are available to users of the environment.

Set-top box with resident games application: 1. The application can be downloaded by the server into the set-top box or resides in the box. 2. Display the list of games. 3. Select a game. 4. Authorization. 5. Set-top box transformed into a game console.

E. E-services. E-services include different topics such as e-medical, e-travel, e-house improvement, e-gardening, and so on. An e-service provides two levels of knowledge. One level is the primary knowledge of the topic that customers want to know or get in that field. The next level provides expertise of the field that provides suggestions or solutions to some problems customers may have. E-services in the environment of the invention have a rich user interface, including text, video, audio, pictures, tables, and their combinations, so that customers do not feel bored by the program.

As an example of the potential applications of the virtual environment of the invention, E-medical services may be offered as an e-service. For example, the environment may offer:

Graphical presentations of the human body and detailed parts, such as skeleton and organs.

Graphical presentation of human body functions categorized by sub-systems, such as digestive system and blood system;

Hierarchical presentation and back-forward link so that any part can be easily identified and presented verbally and graphically;

Basic question and answer capability;

Testing the knowledge a customer has mastered in the field;

Output description to a printer.

The expert level provides the following functions:

Interactive capability for answering and explaining deeper questions;

An expert system for common health problem diagnostics;

Provides suggestions for possible medical treatment and provides nonprescription treatment if available;

Interface to any medical supply web site for needed medications;

Reporting personal health problem to Subscriber Management System;

Sends an e-mail to a doctor for assistance;

Places a phone call for emergency situations.

F. E-Mail

G. User Assistance and Learning. The User Assistance and Learning module has two major roles. The first one is training the user to use the system and providing online help documents. The system will introduce the environment to the user in a natural and user friendly way so that no prerequisite knowledge is needed in learning the system. The other one is to play the role of an assistant when the user has any problem in using the system. The assistance includes solving problems and providing suggestions. This system needs to talk with the Subscriber Management System and provide possible preference information.

The system may include the following functions:

Generates online help document for any service topics;

Creates a training environment for any service topics;

Be able to train a customer in a natural and friendly way;

Provide content sensitive assistance;

Log training topics for preference analysis.

VI. User Participation

Communication, interaction and participation needs in the virtual environment of this invention may be met through a broad array of communications modes and software applications, including voice over IP, discussion style bulletin boards, person and organizational web sites, chat rooms, instant messaging, e-mail, swap boards, low and high value auctions and virtual flee markets, classified listings, personals, user generated product review boards, user managed events calendars, classified listings, and professional and commercial directories, among others. All of these features may be supported with 24-hour, immediate response customer service, via e-mail, chats, instant messaging, and telephone. The virtual environment of this invention provides the interfaces that allow the user to integrate and use these modes of communications in ways that are appropriate and customizable to their needs and that raise an awareness of the value of the virtual reality environment.

VII. User Support

The key to user acquisition and retention on the Internet is effective user support. Thus, the virtual environment of the invention should be supported by a staff that reflects the composition of the general population: 30% technical and 70% non-technical personnel. Trained customer experience providers must be available to assist users and members in every area of interaction with the virtual environment. They may help users and members connect to the environment, find information and services, purchase products and conduct all of the commercial and non-commercial transactions available in the virtual environment of this invention.

VIII. Hardware Specification for System

The back-end system provides the services that less fortunate users spend so much time searching-out and setting-up with such unreliable satisfaction; Artificial Intelligence and extension of the natural interface model allow tasks like banking and shopping to be performed with speed and ease that up until now required a human helper.

User Interface: microphone/cordless phone, speaker, mouse, keyboard, TV/monitor

Set-top box: CPU, memory, storage, operating system, Internet connectivity, device connectivity (Input/Output)

Internet Service Servers: Customer servers, application servers, backup servers, database servers Call Center Satellite Connectivity: Receiver, Decoder Standards This section lists the industrial standards recommended for the preferred embodiment of the invention.

Network Communication Protocol

TCP/IP (Transmission Control Protocol/Internet Protocol) for transferring information across the Internet Document Publishing and Viewing Protocol HTML (Hypertext Markup Language)

XML (Extensible Markup Language)

DHTML (Dynamic HTML)

E-Mail Protocol

SMTP (Simple Message Transfer Protocol) for sending and receiving e-mails among servers S/MIME (Secure Multipurpose Internet Mail Extensions) for encoding/decoding binary files and email encryption POP3 (Post Office Protocol) for accessing e-mail from a mail server IMAP4 (Internet Message Access Protocol) similar functions to POP3 with more features Web Navigation Protocol HTTP (Hypertext Transfer Protocol) for retrieving web pages from web servers Data Compression Protocol

MPEG-2

MPEG-4

Security Protocol
  SSL (Secure Sockets layer) for security
  SET (Secure Electronic Transaction) for supporting credit card payment Smart Card Reader
  ISO/IEC 7816-3 (International Standards Organization)

System Services and Supporting Tools

The present invention will provide to its users two groups of services. One is based on the Internet and related technologies and another on television broadcasting. This section lists these services and describes the functions needed to fulfill each service. Besides the customer services, there are some system tools or functions to support customer services. These tools and their descriptions are also presented in this section.

Since some of the services are based on these tools, we will describe first the system tools then the services.

System supporting tools
  User Management System ("UMS")

The UMS provides functions required in the virtual environment to manage user's data such as profiles, preferences and favorites. It accesses the user's database, provides user information to user authentication system, sends requests to the user authorization system and accepts updates from UMS.

In the preferred embodiment of this invention the UMS includes the following functions:
  Register, modify, and delete users' profiles
  Track and modify users' preferences and favorites
  Provide users' preference and favorite report
  Statistical analysis of users' records User Billing and Account Management System ("UBAMS)

The UBAMS provides the support required in the virtual environment to accurately manage individual's financial account. It communicates with the UMS and user authorization system, and have interface with related outside businesses such as banks and credit card companies.

This system includes the following functions:
  Register, modify, and cancel subscriber financial records
  Inventory management of set-top boxes and smart cards
  Transaction recording and history logging
  Fault management
  Bill preparation and formatting
  Presentation of bills in electronic formats
  Accounting and auditing facilities
  Multilingual and multi-currency capability
  Interface with banks and credit card companies User Authentication System (UANS)
  Encrypts and decrypts data send to set-top box and received from set-top boxes;
  Identifies a smart card
  Identifies a subscriber's login name and password
  Identifies a smart card ID
  Manages a subscriber's related data User Authorization System (SARS)

The main task of the UANS is to translate the requests coming from the SMS into entitlement management messages (EMMs) and entitlement control messages (ECMs). An ECM is used to carry authorization details and are subscriber specific. ECMs, on the other hand, carry program and service specific information, including control words that are used by the smart card to decrypt the relevant program. These authorization messages are then sent via the digital multiplex to the smart card, which is located in the set-top-box. They are sent to users on a regular interval (for instance, every month) to renew subscription rights on the smart cards. In the case of Pay Per View (PPV) applications, the SAS may send a certain amount of electronic tokens to the smart card that will allow users to purchase a variety of PPV events. The SAS contains database(s) that are capable of storing the following items of information:
  Pay TV product information
  Data to support the electronic TV guide
  Identification numbers of smart cards
  Customer profiles
  Scheduling data The User Authorization System includes the following functions:
  Generates EMMs and ECMs
  Creates and modifies user's data of authorization
  Manages pay TV product information and TV guide Basic Information Service—system requirements:

The environment of the invention may provides the user with information like news, weather, sports, stock quotes, and so on. The service can be customized according to individual tastes. The medium of the service can be an audio broadcast or be displayed on TV. The information will be provided during the set-top box initialization so that customers will not notice possible delay of system initialization. Another feature of the environment of the invention is to provide alert or notice to users, reminding them that a new e-mail just arrived, or a television program will be broadcasted in about 10 minutes, or a chatter asks for a conversation and waiting for his or her reply, and so on.

An important characteristic of the environment of the invention is that the service is user friendly and as natural as possible. In addition, the content meets users' preferences.

IX. Servers

The environment in the preferred embodiment may include the following servers:

A user profile server: To accept a customer connection request and authenticating the service.

A basic service server: The server composes the service information for each registered customer according to his/her profile. When a customer logs in to a set-top box, the customer preferred media, determined by previous connection, presents current contents of the service, i.e. the contents should be different from the previous logins for the same user. The contents are arranged according to their preference and no repeated information is presented each time. The user can go back to review previous content of the day.

An application server: When users' requests cannot be provided by the environment, the basic server invokes the application server to provide the needed services.

X. Smart Card

In E-commerce, using smart card instead of using a credit card to purchase an article will replace the credit transaction processes by E-cash. When the merchant server receives a confirmed purchase request, a smart card reader connected with a set-top box will accomplish the money transaction and tell the merchant server to finish the other purchase process.

A smart card is just a very simple computer. It has a CPU, RAM, ROM and EEPROM for an operating system and a serial I/O interface. It has no interface for keyboards and monitors. The software for a smart card should include the following tasks:

Data transmission over the bi-directional, serial terminal interface.

Loading, operating, and management of applications.

Execution control and instruction processing.

Protected access to data.

Memory management.

File management.

Management and execution of cryptographic algorithms.

A smart card reader connected to the set-top box performs the following tasks:

Identify card acceptability.

Authenticating an individual subscriber.

Authorizing the services.

Data transaction.

No repudiation: a third party is required to verify that the transaction happened.

Cryptography: encrypting data when transmitting.

Issuing a smart card or modifying data in a card.

Account management and money transaction when using the card

Scope/Overview

Certain aspects of the design of the preferred embodiment have several viable alternatives. Some of the main alternatives as are identified herein. Nonetheless, other alternatives are possible in other embodiments of the invention and fall within the scope therewith. Its advantages and the recommended configuration including mid-level block diagrams are described in the following sections.

1 A Vision of the Set-Top-Box as an Appliance

The Set-Top-Box ("STB") is the user's tool to visit the environment of the invention; a virtual 3D world with an interface optimized for human interaction and preferences e.g. music, movies, TV, banking, shopping, among others. All may be available at a word request and of course are faster and cheaper than a drive to the store.

The hardware of the STB differs from that of a regular computer. It has no floppy drive, no noisy cooling fan, will connect to a TV, at least with NTSC/PAL and HDTV, VGA and S-Video, will remain options. A tuner, a remote control and a keyboard are essential in the design of the preferred embodiment of the environment of the invention.

The software includes Speech Processing. Virtual Reality (VR) and Artificial Intelligence technologies, voice mail and video mail are also part of the preferred embodiment.

The design and operation of the STB are geared towards technically inexperienced users, who don't have the patience or inclination to deal with software upgrades, cryptic error messages, installation configuration or complicated instruction manuals.

2. Participant's Interface

There should be no confusion as to how to use the STB, no ambiguity, and no apprehension or frustration generated. If the user dreads to use the environment of the invention, the environment is not fulfilling its purpose.

The interface should be friendly, non-threatening even if that does not contribute to the efficiency of an experienced user. The user will have preemptive control, e.g. if a site, a picture or a program is loading too slowly, the user will be able to "instantly" abort the process or to select another option.

Hardware Interface

The system is designed to be ready-to-go right out-of-the-box with minimum plug-in peripherals like a mouse, keyboard, power-supply and video cable. More emphasis is placed on the wireless technology and on the integration of functions into one physical case like the Universal Serial Bus (USB) with its "plug it in anywhere, it will fit" auto configurability. User will interface with system hardware through mostly three components:

1. The STB itself will have no real user interface except a power switch (and possibly a microphone and/or speaker). Certain external connections are user interfaces insofar as the User will have to plug-in the appropriate cables. The STB might incorporate a microphone jack, but certainly will need audio and video outputs, etc.

2. The Voice Remote Control 1101, provides at least rudimentary cursor control and select functions, as well as a microphone. In an embodiment of the invention telephone technology may be implemented in the design, because cordless phones already incorporate audio and at least rudimentary digital (button) communications channels. A standard IR remote control might be modified to incorporate audio and use RF instead of, or in addition to, IR for no directionality, continuous operation and non-line-of-sight operation.

3. The Passive Pointing Device (PPD) 1102: is in the form of a hardware device sitting on top of the TV that provides modulated invisible IR illumination and captures and analyses images to produce cursor-control commands. It is designed to respond to the position of a retro reflective "marker" that would be attached to the VCR, or perhaps provided as a separate device. The mapping of the user's control motions to the plane of the TV screen is direct, unlike other types of pointing devices (mouse, trackballs, joysticks, etc.).

The actual set-up of the necessary connections of the STB to the Internet, TV, and to the VCR has many permutations. Thus, in order to accommodate for various users' needs, the user may be provided with a step-by-step user manual that contains various configurations such as those presented in FIGS. 1-6 and in Table 1.

Software Interface:

The underlying philosophy behind this invention is the implementation of voice technology, virtual reality, artificial intelligence, and an Intelligence Center (FIG. 8). An Illustration on how users interface with the system during setup and upgrades is presented in the following paragraphs:

Artificial Intelligence (AI) for Set-Up: One of the main thrusts behind the invention is the implementation of artificial intelligence. As an illustration, let us consider the first phase when the new user interacts with the system:

To initiate the service, the participant hooks up the STB to the TV and to his service provider through his/her phone line or broadband cable, etc., turn it on, and uses its remote control and/or its wireless keyboard to interact with the environment of the invention. After turning on his new STB, the TV will show a logo, or other suitable output, to indicate that it sees the box. If the box detects the RF signal, i.e., if the user correctly attached the antenna or cable TV lead, etc. to the appropriate jack, then the STB will display a message on the TV screen indicating that the connection is working too. At this point in time the server starts to automatically interrogate the STB without any input from the participant, inquiring its type and capabilities. (e.g.: "I am a Meteoroid International Pentium XIII 8000 MHz w/512 Mb memory, 100 GB HDD, 10×DVD, xyz-Type Graphics Processor, running Windows NT 2001 rev 115.99, over DSL communications, etc."). In response, the server selects the appropriate code package and the requested services for the STB. It then automatically downloads/installs the appropriate software without involving the participant. The software then determines that the system is in a "Set-Up State". Accordingly an Avatar appears and announces, "Can you see me? Say 'Yes' or 'Si' if you can, Say 'No' or hit 'Delete' if you can't." ... "Can you hear me? Say 'Yes' or 'Si' if you can, Say 'No' or hit 'Delete' if you can't." etc. Communication may take place in any language. These words are simultaneously displayed on the screen where further interaction elucidates and guides the rest of the installation. With some help from the user, the program will detect if TV/Cable is connected correctly, if the microphone is connected correctly, and whether the user can see and hear it, speak to it, use the Keyboard and Remote Control, etc.

Using The Mission's Artificial Intelligence System as well as the Artificial Intelligence Center of this invention would also allow to log user's concerns, failure events, as well as some diagnostics.

These assessments may be used to improve user services where the server has the capability to upgrade the code as improved versions become available, or to replace corrupted code, in a non-transparent fashion to the user.

Artificial Intelligence for Upgrade: Once the system is initially set-up and running, the user can have a variety of interactions with it. The basic scenario includes those methods that are necessary and sufficient for making effective use of the system, but enhancements, additional hardware or features are also possible. The setup AI routine will get the user to the optimal configuration, and will be available to help optimize it at any time. For example, the simplest Video connection might be by connecting the STB to the TV A/V jacks or even through an external RF modulator (like FIG. 3), but neither method is optimized until some other connections are made. Software upgrades will make it possible to provide functions to the user that are not part of the basic or initial functionality, including the detection of the installation of any optional or enhanced peripherals. Hardware upgrades will be easily accommodated by an automatic invocation/installation of the required software. If, for instance, a new IR Remote Control is used for the first time, or the Passive Pointing Device is installed, the user will not have to attend to any technical manual, search for a disk or download a driver; whatever setup is needed it will be taken care of automatically, with code being downloaded from the internet (or the distribution disk) as necessary.

Artificial Intelligence and Artificial Intelligence Center: an illustration on how to implement these concepts is presented in the mid and top-level diagram shown in FIGS. 7A, 7B, and 8.

STB Hardware Functional Blocks

The features intended for inclusion in the STB include, but are not limited to, those shown in FIGS. 9 and 11-13 where the major functional blocks/features are discussed below.

Video Programming enters the STB from Broadcast, Cable, Satellite or other sources through either the RF or Video Inputs 901. This is one area where different service configurations may occur. For example, certain sources may use a baseband form, i.e., not change the modulation of the digital signals. Others may modulate the signals onto broadcast frequency 3 or 4. In general, the signal quality is best if it is baseband video, so that it does not have to lose quality from having to go through modulation and demodulation, but this of course is limited to few miles. In many installations only RF (modulated) will be available, so, to have "picture-in-picture" or text/image overlay, one will need a tuner/demodulator. By passing the DEMODULATED video through the box, a sort of "picture-in-picture" function can be invoked, and the system can be ready for invocation even when the user is just watching TV. This convenience is key to getting the user to spend time with the environment and he or she must come to take this access for granted The IR Receiver Port 902 permits compatibility with custom or standard third-party IR keyboards 903, and with standard IR Remote Controls.

If no IR Remote control is provided, the ability to control the Power and Volume (and other functions) of a TV requires an external IR source ("IR Blaster") 904, probably a little emitter on the end of a cord, and either an IR receiver (to acquire the necessary codes ["Learning Remote" function]) or the purchase of a universal remote control library such as those available, for example, from Sejin or Universal Electronics. The mode of operation would involve the reception of a command from the Voice Remote Control (VRC) 905, which is translated into an IR command.

The IR Pointing Device Receiver 906 uses the modulated IR signal reflected from a button, baton or thimble of IR reflective material 907 to control an on-screen cursor. The function of the IR Receiver Port 902 might be combined into this to allow simultaneous communications and cursor control. Likewise, the modulated IR signal source, the Pointing Device Stimulus Generator 904, can also serve as an IR communications transmitter. In order to be able to control a TV (e.g. POWER or VOLUME), it is necessary to either have IR transmission capability on the Remote Control, or from the STB (an "IR Blaster" function). The IR codes may be either acquired from an existing Remote Control ("Learning") or from a library of codes ("Universal").

The Sound Processor 908 provides analog stereo signals to a TV or Stereo 909, and preferably the ability to accept external input for sampling or mixing with the output (needed for use with the "Video In" function).

The Graphics Processing Unit (GPU) 910 produces the output to go to the TV, as well as, preferably, an auxiliary VGA or other high-resolution output. The NTSC output consists of the STB-generated video overlaying ("picture-in-picture") or mixed with the video-programming source. The massive graphics-processing load presented by this application is served by a high-end GPU; currently Nvidia makes the device with best price/performance that is adequate. The Accelerated Graphics Port (AGP) is the interface used by this class of GPU.

Communications with the combination Microphone/Remote Control (Voice Remote Control, VRC) 905 must be RF, for continuous function, as well as for non-Line-Of-Sight operation. There are several choices as to the details of how this can be accomplished.

FIG. 9 shows a method relying on the RF technology developed for Cordless Phones. By providing a very simple circuit on a phone-line modem, the phone may be connected directly to the phone line through a relay, so that it would function normally, or it may be switched to a simple circuit that imitates the phone line, so that the user is now "talking to" the STB. DTMF may be decoded in order to use the buttons to perform functions, and only the DTMF-generating buttons may be usable for control. FIG. 10 has a suggested assignment of the twelve standard phone buttons.

FIG. 11 shows another method of using the technology developed for cordless phones. Qutek has developed a telephone with a 56 k modem integrated into its base station, with a USB connection to a computer. Depending on the details of the internal circuitry, it may be possible, in another embodiment of the invention, to slightly modify the mode of operation of this device to have it function as a link, connecting audio between the computer and the handset. Because the proprietary link between the handset and base station is also available to them for programming, it should be possible for the modified phone to send the computer button-press information directly, rather than having to rely on DTMF decoding, and this would also allow the assignment of control functions to the other buttons on the handset. Note that a DTMF decoding capability may still be useful in certain cases.

FIG. 12 shows the technologically most elegant method, with a custom VRC based on some technology like Blue-Tooth (BT). The easiest way to get there would be to incorporate a standard BT transceiver card into a modified IR Remote Control (from Universal Electronics or Sejin, etc.) to incorporate RF technology in parallel with IR. This would permit choosing a model with whatever fancy features one desires, including an integrated Pointing Device.

At least one general-purpose Communications Port 911 may be provided for features like printer and computer connectivity. USB may be used, as it is designed for expandability, and to be used for both digitally coded audio and other digital communications. 10/100 card may be used to support the current interface of choice for DSL and other high-speed modems. It may be necessary to provide an external DSL modem 912 because of all the different flavors that exist.

An Internal 56 k Modem 913 may be included in the STB to provide a rudimentary means by which the STB can communicate via the internet if no faster connection is available.

The CPU 914 and Graphics Processing Unit (GPU) 910 systems perform the processing. A Hard Disk Drive (HDD) may be included as well as a fast processor and large memory, see table 2.

The STB has a DVD-ROM drive 915. The operating system and application code may be stored on a high-density medium, a CD disk which makes it possible to load new machines quickly, and to give the user a way to reload the system to a usable state in case of system crash. The BIOS will determine which disk is considered for restoring the system. This concept may be complemented by an Intelligence Center in order to minimize user inconvenience. This Disk will be always in the drive so that, if the user removes it to play another disk, or for any other reason, the application should request it back at the first reasonable opportunity, so that it doesn't become lost.

The code on the disk will not correspond to the latest version of the software, but just to a workable one, with upgrades being via the connection to the servers. As the distance between the disk version and the latest version increases, there will come a point where it may be better to issue an upgraded CD. The DVD player allows the opportunity to provide users with more option for entertainment.

In an embodiment of the invention an RF output may be provided. However, this is a relatively expensive function to add, and would probably be needed by a small fraction of users: most TVs and most VCRs these days have NTSC (baseband) Video (and Audio) Inputs, the use of which is both more convenient and better quality than RF-modulating the video, then demodulating it in the TV (or VCR) back to baseband. An external RF modulator may be supplied as an option.

The preferred embodiment of the STB is presented in the configuration of FIG. 13. The adaptation of telephone technology provides an adequate Voice Remote Control function and allows VoIP as well as normal telephony. Functions that are not included in this configuration may be added as part of other embodiments, e.g. the PPD and the IR RC). Detailed Specifications of the preferred embodiment of the STB are presented in table 2.

Voice Remote Control (VRC)

The Remote Control (RC) to be used for controlling the STB must also transmit reasonable-quality audio for Voice Recognition (VR). It also must serve to control the user's TV, and serve as a cursor-control device.

As discussed above, there are two plausible methods of obtaining a device capable of meeting these requirements: using Remote Control technology and adding wireless (RF) audio capability by implementing the emerging Blue Tooth technology or using telephone technology for its wireless RF audio capability, and adding Remote Control to it. This last approach is adopted in the preferred embodiment.

The sound quality for VR provided by a phone-based technology is excellent, because the telephone design is optimized for this, and people are used to the associated speaking model. The earpiece encourages people to hold the microphone in the correct location, improving sound quality and stabilizing volume, and the side tone generated in their ear provides a feedback of their speaking volume that further stabilizes it. The telephone technology might be incorporated in one of two ways, by allowing any phone to be used, or by using a special design that incorporates the necessary circuits into a phone.

To make any phone serve as a VRC, it is be necessary to provide for connecting the phone to a regular phone line, so that it can function normally, as well as to a "Telco simulator" circuit. A pair of resistors connected to +12V and −12V should be sufficient, as this gives properties similar to those a phone sees when it is picked-up as an extension on an established conversation. Audio from the STB is generated and coupled to the phone. The audio from the phone is then sampled and sent to the STB. It would be reasonable to combine this function with either a modem (a "software modem") or a sound card, or both. Because one of the important advantages of this scheme is allowing the user to employ his or her own phone, the one he already has, the user is provided with a method by which the phone can be made to function normally (by connecting it through a switch [relay] to the phone line when it is not being used as a Remote Control). This method would only allow control functions to be assigned to the twelve DTMF-generating buttons, a significant limitation.

The Blue Tooth (BT) is supposed to eventually cost no more than $5 to incorporate into a device: Once the base station is in place, all sorts of wireless interactions with all sorts of devices (cell phones, PDAs, printers, computers, etc.) are possible further embodiments of the invention. To control the user's TV or other devices, one would have to arrange to get access to the library of IR codes maintained by a "Universal Remote Control" manufacturer (Sejin and Universal are two), or we one have to incorporate an IR receiver and implement a "Learning" method. Three major advantages of this approach are the abundance of buttons provided, the availability of universal libraries of codes (and the presence of an IR emitter) for controlling TVs, and the existence of models with various sorts of pointing devices.

All likely features intended for inclusion in the Smart Control are included, but not limited to, in those shown in FIG. 14. Major functional blocks/features are discussed below:

The communications port labeled "To PDA" 1401 allows this control's micro controller 1402 to communicate with such a device that may be used to contain e-mail addresses, telephone numbers, and function-expanding software, possibly including Voice Recognition (VR). The PDA may also communicate (indirectly) with the Set-Top Box (STB) 1403 and also through the Infra Red (IR) transmit 1404 and receive 1405 blocks, which makes possible a very powerful Universal Remote Control function.

RF communications 1406 allow the device to control functions of the STB, to serve as a communications channel between the PDA and STB, to be controlled by the STB (since BlueTooth or a similar bi-directional communications protocol may be used), and to function as a wireless handset for a landline POTS telephone, Internet telephone, or for VR control. Enhanced functionality may incorporate the full functions of a PCS or Cellular telephone into these blocks.

The IR transmitter 1404 allows control of existing Audio/Video equipment and may be used in conjunction with the STE to provide an on-screen cursor-control function in an embodiment lacking RF.

The IR receiver 1405 allows for programming the IR control codes for equipment not supported by an internal library of codes.

A display 1407 may be used for such functions as Caller ID, Number Last Dialed, or system status. A more extensive display may be incorporated into the PDA.

The speaker 1408 can be used both for allowing the STB's program to interact audibly with the user without disturbing others present, in a "Remote Locate" beeping function, and when the device is used as a telephone. By implementing side tone and audio from the speaker, the user is encouraged to hold the microphone 1409 in the optimal position and keep a regulated speaking volume. This is important for VR (Voice Recognition).

The microphone 1409 can be used both for allowing the user to interact verbally with the STB (through VR), and when the device is used as a telephone, and for recording voice messages to be sent by e-mail.

The keypad 1410 allows for system control, including cursor control, and telephone or VoIP (Voice over Internet Protocol/Provider) (Internet Phone) dialing.

FIG. 15 shows conceptually the preferred initial embodiment obtained by making use of existing wireless telephone technology by one method discussed above under "Preferred Configuration of the Set-Top-Box." Some details of this implementation are omitted from FIG. 15 that pertain to the connection of the base station of the cordless phone adaptation. See discussion of DTMF decoding and suggested keypad assignments. Note that the necessary control of TV functions (Power, Volume, etc.) must, in this embodiment, be via an "IR Blaster" function incorporated into the STB.

If a telephone incorporating a USB or other bi-directional digital communications channel to the STB is constructed, it is important that certain control commands be available for maximum ease in programming and flexibility of function. Further, it is probably best to make as little of the actual control sequence as possible incorporated in the phone device itself, and provide a rich set of low-level commands, as it is easier to correct program errors and add new features by changing the STB's program.

Below is a list of suggested hardware commands to be made available. In some embodiments, they are not actually necessary, for example "Generate DTMF Digit" as this could be done in the computer and transferred as an audio stream, but the phone can do this easier, and reduce the computational load. Likewise with the button press information: The DTMF generated by the numeral buttons can be recognized/decoded in the computer, but it is already necessary to report the key presses of the non-numeral buttons, if they are to be used for remote control functions. Either in response to a specific status request, or in response to any successful command, the phone/RC should respond with a message that reports status, for example, hookswitch and button conditions, whether status has changed since last status report, etc. Here is a suggestion of how many bits to report (bits):

(1) Hookswitch current status ( ) Hookswitch control local or computer (maybe more bits for "mode").

(1) Speakerphone activated.

(3) Speakerphone volume (3) Earpiece volume (6×2) Pipe status for each possible pipe (Open/Closed, error).

(~20) Status of each button.

(1) Whether any button has changed since last status.

(1) Loop current detected.

(1) Ringing detected since last status (SLS).

(8) New Caller ID available (how many are available in phone memory).

(1) User change of speed dial memory occurred SLS.

(8) Telephone number dialed SLS (how many are available in phone memory).

(8) New DTMF digit detected SLS (how many are available in phone memory).

(1) Handset in cradle (charging).

(1) Handset needs charging.

(1) Handset active (transmitting).

(1) Handset functioning. (Detects whether handset is in-range, charged, turned-on.)

(~8) Model/capabilities.

So about 81 bits would be reported. Other, special reports would be in response to queries for the contents of Last Number Dialed register(s), Speed Dial registers, and Caller ID.

As far as the possible audio channels, there are a variety of functions that may be provided if the hardware is sufficiently flexible. Assuming there are six audio channels, three "in" and three "out", as in the table below, here are some functions, and the pipes that would be needed:

(1) Monitor the line for busy signals and dial tone and such, for placing automatic phone calls, modem smart retries, "camp on" function. (3)

(2) User calls in to tell machine "Record 'Survivor' for me tonight." (Remote Control) (3,4)

(3) Answering Machine. (3,4)

(4) Normal use as Voice Remote Control. (1,2) possibly (5,6), (1,6), (1,2,6) etc.

(5) Get Billy's attention because you've left him an emergency voice message ( . . . BILL . . . BILL . . . BILL . . . ) or there's an urgent e-mail addressed to Sally ( . . . SALLY . . . SALLY . . . ) (6)

Passive Pointing Device (PPD)

The Pointing Device (PD) supplied with the system is to be in two parts, a part resident on or in or adjacent to the Set-Top Box (STB), and a passive part that will be in the form of a reflective button, thimble or baton. The mode of operation would not require this to be either a unique material or object, nor for it to be of expensive construction. A bicycle reflector (provided it reflects Infra-Red light [IR]) would be adequate.

The operation of the PPD may be described as follows: A device equipped with an optical array sensor tracks the position of the pointing device target by its reflectivity. It does this in a way that avoids interference caused by extraneous light sources by providing its own signature illumination, readily distinguishable from other sources of illumination. In the preferred embodiment the illumination should be IR and should be modulated in a way that can be detected in the presence of other light sources. By taking "pictures" of the room scene with the illumination alternately ON and OFF, the difference between two consecutive values of a given pixel will usually be proportional to the reflectivity, in the IR, of the objects visible in the solid volume whose projection corresponds to the particular pixel. (Exceptions are instances where a light source is suddenly occluded or extinguished, or the reverse.) Most objects are not particularly reflective in the IR, but retro reflectors are extremely so, so they will normally dominate this reflective image if present.

The reflective image can be processed in several ways to detect motion: an algorithm may identify and track the most reflective objects (represented by individual pixels or contiguous groups that have higher reflectivity than the background) or an auto correlation function can repeatedly try fits in each of the cardinal directions, reporting motion when one of these produces a better fit than the null correlation, or a change in the position of the center-of-mass or centroid of the whole distribution could be reported. The first method requires a much greater degree of abstraction and computation, as abstracting identifiable "objects" from the scene's background and maintaining an identification of them as they morph and move is a nontrivial problem. The second method also involves considerable computation, as the auto-correlation function would require on the order of 5n (n is the number of pixels) multiplications for each frame. The last method requires only on the order of n multiplications. The three methods would also appear to offer decreasing levels of precision, but at least the last method would allow the contamination of the visible scene with extraneous reflective objects to cause only gradual and graceful degradation of sensitivity, as the amount of motion of the PD target needed to move the centroid will increase as the proportion of the reflectivity contributed by the target decreases. Even this might be remedied by a long time-constant per-pixel or "Fatigue" function. The properties of the second method remain to be investigated, but it appears that, in the absence of a Fatigue function, it would take very little background reflectivity to overwhelm the contribution that would be made to the overall autocorrelation by a moving target.

A high-powered LED is the obvious choice for the illumination source, a commercial retro reflector for the target, leaving the sensor as the least defined of the system components. A low-resolution array as used in the HDNS-2000 optical mouse pointing engine from Agilent (HP) would be sufficient if only resolution sufficient to navigate web sites on the TV or to select menu items or control buttons is the intended application. It is doubtful this PD idea could ever be sufficiently accurate for purposes like drafting or editing text. The IR source could also be used as a Command and Control (C&C) output for home electronics (like a stereo), or to transmit to a device like a PDA that is equipped similarly (see the Set-Top Box Analysis, discussed above).

Operating the system at a high image rate compared to the 120 (or 100) Hz flash rate of fluorescent and other discharge-based lighting would allow this source of interference to be ignored, as would synchronizing the image rate to the flash rate (or a sub harmonic), or using a rate that matches closely enough that the changing contribution of this illumination source frame-to-frame is minor. Otherwise, some form of frame-wide intensity normalization may be helpful.

The density of the pixels into which the scene is divided largely determines the resolution of the PD, even though the methods above, especially "object tracking" and "centroid tracking," can obtain sub-pixel motion information. Even if an image array with finer granularity than needed is used, summing the outputs of blocks of pixels can reduce the computational load. The distribution of the projected pixels, and therefore of the PD sensitivity in the field need not be uniform. If the peripheral pixels were radially "stretched" by the optical system, or if the effective pixels used by the system were composed of the unions of non uniformly distributed physical sensor pixels, the sensitivity at the center of the scene (presumably directly in front of the display in use [probably a TV]) could be greater than towards the periphery, allowing the pointing device to operate over a given projected "area" (solid angle) with a given (peak) resolution, with reduced computational load.

Of the arrays listed, the TV-type camera ones are the most prevalent, and are likely cheaper than the low-density ones due to their volume manufacturing economics. The only low-density array-based product that could be found that is in actual production is the HP/Agilent HDNS2000 optical mouse sensor, which would, with a change of the embedded code, serve the purposes of this invention, except that this would probably change the price considerably from what the mouse manufacturers are paying. On the other hand, if it is possible to synchronize an illuminator with the electronic shutter function of a normal digital camera, then, provided the camera is sensitive to the IR illumination, one should be able to extract cursor-control information from its output. The camera would still be able to function as a "web cam," except that there might be some objectionable artifacts introduced while the tracking system of the PD is active.

Glossary

AGP: (Accelerated Graphics Port) A high-speed graphics port from Intel that provides a direct connection between the display adapter and memory. AGP is faster than PCI, and only one AGP slot is provided on AGP-equipped motherboards. The PCI slot that would normally hold the display adapter can be used for another device. The brown AGP slot is slightly shorter than the white PCI slot and is located about an inch farther back.

AGP uses a 32-bit bus. The original AGP standard (AGP 1×) provides a data transfer rate of 264 Mbytes/sec. AGP 2× is 528 Mbytes/sec. AGP 4× is 1 Gbytes/sec. AGP 8× is 2 Gbytes/sec.

BIOS: (Basic Input Output System) An essential set of routines in a PC, which is stored on a chip and provides an interface between the operating system and the hardware. The BIOS supports all peripheral technologies and internal services such as the real time clock (time and date). The BIOS tests the system and prepares the computer for operation by querying its own small CMOS memory bank for drive and other configuration settings. It searches for other BIOS's on the plug-in boards and sets up pointers (interrupt vectors) in memory to access those routines. It then loads the operating system and passes control to it. The DIOS accepts requests from the drivers as well as the application programs. BIOS's must periodically be updated to keep pace with new peripheral technologies. If the BIOS is stored on a ROM chip (ROM BIOS), it must be replaced. Newer BIOSs are stored on a flash memory chip that can be upgraded via software. See BIOS upgrades.

On startup, the BIOS searches all peripheral controllers in the system to obtain the current configuration, which it makes available to the software.

Bluetooth: A wireless personal area network (PAN) technology from the Bluetooth Special Interest Group, (www.bluetooth.com), founded in 1998 by Ericsson, IBM, Intel, Nokia and Toshiba. Bluetooth is an open standard for short-range transmission of digital voice and data between mobile devices (laptops, PDAs, phones) and desktop devices. It supports point-to-point and multipoint applications Bluetooth provides up to 720 Kbps data transfer within a range of 10 meters and up to 100 meters with a power boost. Unlike IrDA, which requires that devices be aimed at each other (line of sight), Bluetooth uses omni directional radio waves that can transmit through walls and other non-metal barriers. Bluetooth transmits in the unlicensed 2.4 GHz band and uses a frequency hopping spread spectrum technique that changes its signal 1600 times per second. If there is interference from other devices, the transmission does not stop, but its speed is downgraded. The name Bluetooth comes from King Harald Blatan (Bluetooth) of Denmark. In the 10th century, he began to Christianize the country. Ericsson (Scandinavian company) was the first to develop this specification CPU: (Central Processing Unit) The computing part of the computer. Also called the "processor," it is made up of the control unit and ALU. Today, the CPUs of almost all computers are contained on a single chip.

DTMF: (Dual-Tone Multi Frequency) The type of audio signals that are generated when you press the buttons on a touch-tone telephone.

LED: (Light Emitting Diode) A display technology that uses a semiconductor diode that emits light when charged. It usually gives off a red glow, although other colors can be generated. It is used in readouts and on/off lights in a myriad of electronic appliances. It was the first digital watch display, but was superseded by LCD, which uses less power.

LEDs are also used as a light source for fiber-optic transmission. They are typically used with lower-bandwidth multimode fibers.

NTSC: (National TV Standards Committee) A color TV standard that was developed in the U.S. Administered by the FCC, NTSC broadcasts 30 interlaced frames per second (60 half frames per second, or 60 "fields" per second in TV jargon) at 525 lines of resolution. The signal is a composite of red, green and blue and includes an audio FM frequency and an MTS signal for stereo. NTSC is used throughout the world including the U.S., Canada, Japan, South Korea, and several Central and South American countries.

PAL: (Phase Alternating Line) A color TV standard that was developed in Germany. It broadcasts 25 interlaced frames per second (50 half frames per second) at 625 lines of resolution. Brazil uses PAL M, which broadcasts 30 fps. PAL is used throughout Europe and China as well as in various African, South American and Middle Eastern countries. PAL's color signals are maintained automatically, and the TV set does not have a user-adjustable hue control.

RF: (Radio Frequency) The range of electromagnetic frequencies above the audio range and below visible light. All broadcast transmissions, from AM radio to satellites, fall into this range, which is between 30 kHz and 300 GHz.

S-video: (Super-video) Recording and transmitting video by keeping luminance (Y) and color information (C) on separate channels. S-video uses a special 5-pin connector rather than the common RCA phono plug. It is widely used on camcorders, VCRs and A/V receivers and amplifiers. If S-video connectors are available between the two devices you want to hook up, using an S-video cable will improve transmission quality and the image at the receiving end.

USB: (Universal Serial Bus) USB connects more than computers and peripherals. It has the power to connect you with a whole new world of PC experiences. USB is your instant connection to the fun of digital photography or the limitless creative possibilities of digital imaging. A person can use USB to connect with other people through the power of PC-telephony and video conferencing.

VGA: (Video Graphics Array) The minimum standard for PC video display, which originated with IBM's PS/2 models in 1987. It supports earlier CGA and EGA modes and requires an analog monitor. VGA was initially 640×480 pixels with 16 colors, but non-IBM vendors quickly boosted resolution and colors to so-called "Super VGA," which was later standardized by VESA. All VGA display adapters today start at 256 colors IP telephony: The two-way transmission of audio over an IP network. When used in a private intranet or WAN, it is generally known as "voice over IP," or "VoIP." When the public Internet is the transport vehicle, it is referred to as "Internet telephony," however; all three terms are used synonymously.

Private networks can provide from good to excellent quality, matching that of the PSTN. Over the Internet, voice quality varies considerably; however, protocols that support quality of service (QoS) are expected to improve this condition. Nevertheless, Internet telephony means free voice calls as long as sending and receiving users have identical software that uses proprietary techniques or compatible software that uses the H.323 standard. They must also be willing to talk from their PCs and to prearrange the times to talk. When users go online and launch their IP telephony client software, the session and current IP address is registered on a directory server on the Internet so that others may contact them. Using Internet telephony service providers (ITSPs), users can make PC-to-phone or phone-to-phone calls, using the Internet as the network backbone. ITSPs have been initially popular for international calls. Another IP telephony application that is expected to take off is with call centers that can answer a question directly from a Web site. This voice integration is desired by users and vendors alike and is expected to flourish in the 2002-2003 time frame. The IP protocol is either being used or being considered for future network backbones by all the major telecom carriers 10/100 card: An Ethernet network adapter (NIC) that supports both 10 BaseT (10 Mbps) and 100 BaseT (100 Mbps) access methods. Most cards auto negotiate at startup, enabling them to run at the higher speed if supported by the device they are connected to (hub or switch).

PSTN—Plain Standard Telephone Network

ISDN—Integrated Services Digital Network xDSL—Digital Subscriber Line

W-LAN—Wireless Local Area Network (WEE 802.11)

LAN—Local Area Network

WAN—Wide Area Network

STB—Set-Top Box

Set-Top Box Software

The set-top box software assists in providing the following functions, some of which are described hereinafter: speech recognition, speech synthesis, Internet surfing by using a browser, E-mail, Voice over IP, Video over IP, support printer, subscriber authentication, subscriber profile management, data package and un-package, data encryption and decryption, data transmission and communication, user interface, task dispatch and control, system diagnostics and recovery, system initialization, load memory residence programs, set-top box parameters, verifying system hardware functions, and launch system start program.

Interactive user interface. The user interface includes two types of media. One is voice input/output. The other is electronic signal. It includes input from a keyboard, a mouse and a controller; and output to a television, a monitor or any equipment connected to output ports, such as a printer.

Authentication. Authentication may be carried out on both the server side and on the user side. User side authentication will initially come from the server and may be updated periodically. The server side authentication may be carried out when a request is initialed and every transaction may be verified. Simplified user profile can be stored in the user side so that authentication can be done in the user side to accelerate connectivity with processing. Verification of a valid user input, like password, should be done in the user side unless assistance is required.

Data encryption and decryption. Some data may be encrypted before sending to and be decrypted after received from the servers.

Data packaging and un-packaging. Data may be transmitted and received in a standard package size and format.

User side communication mechanism to connect to a server and send customer requests.

A web browser with special functions to display and retrieve data from Internet.

A speech recognition program to accept some voice inputs. Complicated recognition tasks may be implemented at server side.

A dispatch program to control the behavior of all user interfaces, including submitting and canceling customer requests.

Output ports. Transmit data to connected equipment, such as a printer if a printer is connected to the set-top box. System diagnostics and recovery functions.

E-mail user interface for reviewing, composing, deleting e-mail, managing the address book, organizing e-mail in a virtual mail box, printing an e-mail, allowing mail attachments, and so on.

Create and modify customer favorites. Some utilities for storing, accessing and changing downloaded and/or client side data; teletex for customer alert or notice.

TV services. The client program will accept the traditional TV services, support enhanced (interactive) TV programs, and have the control ability over any other TV programs according to customer requests. The traditional TV program or any audio/video signals inputs to the set-top box can be sent to its output directly.

Verbal Communication User Interface Components

The speech recognition system must include at least the following components: a speech recognizer 1601 to convert a voice input 1602 into text according to given vocabulary and grammar models 1603 of the domain knowledge of a language, and a language analyzer 1604 to extract meaning from text by syntactic parsing and semantic interpretation of the text according to semantic rules 1605.

An expert system 1606 with a domain knowledgebase supports the selection of desired actions from the meaning and issues commands to the system to invoke proper actions 1607, such as accessing data from a database system, communicating with other systems, and reporting status of actions. The results of actions are reported in voice communication by a voice synthesizer 1608.

The voice synthesizer must include the following components: a text generator to construct a reply in text form according to the status and results of executing commands and the text from; and a text-to-speech synthesizer to convert the text reply into machine generated speech according to pronunciation rules of the language.

In order to improve the verbal communication user interface, "virtual reality" technology is used.

C. Remote Controller

There are three different embodiments of remotes in the system of the present invention. All are wireless and use IR or RF signals or hybrid IR/RF frequency for communicating (transmitting and receiving) with the Set-Top-Box, PC, TV, VCR, Stereo and Camcorders.

1. Universal Remote. This remote encompasses the following components: wireless microphone and a speaker, wireless pointer device, e.g. wireless mouse, wireless Controller for the TV, VCR, stereo systems and camcorders.

2. Global Remote. This remote encompasses the following components: wireless microphone and speaker (for cordless phone function), wireless pointer device, e.g. wireless mouse, wireless controller for the TV, VCR, stereo systems and camcorders.

3. Upgrade Remote. "Smart Remote". The Upgrade Remote embodiment is in the form of a "Personal Digital Assistant" (PDA) with a central process unit (CPU) and memory.

The remote includes two physical parts, a base and an attachment. The two parts can be connected in following ways 1701: IR, RF, Plug in or slide in.

The base includes the following functions: wireless connection to the set-top box 1702 through IR and RF:

Functioning as a regular cordless telephone

Wireless pointer device, e.g. wireless mouse

Wireless controller for the TV, VCR, stereo system and camcorders

Controls for surfing Internet: Back, Forward, Search, Stop, Home, Refresh, Book Marks, Address Book, Reload, and Arrow Keys Voice communication capability with the set-top box.

The base contains the following physical buttons: adaptor for the attachment to connect, connector to a set-top box 1703 for battery recharge, buttons arranged for all functions The attachment contains the CPU and the memory with battery as power supply. Detached from the base, the attachment can work independently with the functions:

Scientific calculator

Address book and phone book with editing, storing data functions

Dictionary with searching and pattern matching functions

Scheduler with modifying, alerting functions

Calendar, for any years in the past and future, displayed by day, month, or year.

The attachment contains the following physical parts and buttons: connector to connect the base, LCD display, and an alphanumeric input pad.

When the base and the attachment are connected by one of the above mentioned connection mechanisms, additional functions are available besides the functions provided in each separate part:

Switch controls for different functions (more details: between TV mode and Internet mode)

Number pad for telephone functions

Reduce sized alphanumeric pad for text editor

Data transmission from the attachment to the set-top box, which is connected to the virtual environment.

Functional description of the Smart Control

The features in the Smart Control include, but are not limited to, those shown in FIG. 4. Major functional blocks/features are discussed below:

The communications port labeled "To PDA" 1701 allows this control's microcontroller 1704 to communicate with such a device that may be used to contain e-mail addressed, telephone numbers, and function-expanding software, possibly including Voice Recognition ("VR"). The connection to the Personal Digital Assistant ("PDA") from the microphone's A/D Converter 1705 (ADC) allows this. This connection may be conceptual, mediated by the microcontroller 1704, rather than actual and direct. The PDA may also communicate (indirectly) with the Set-Top Box (STB) 1706 and through the InfraRed (IR) transmit 1708 and receive 1709 blocks.

Digital 1710 and Analog 1711 RF communications allow the device to control functions of the STB 1706, to serve as a communications channel between the PDA and STB 1706, to be controlled by the STB 1706, and to function as a wireless handset for a land-line POTS telephone, internet telephone, or for VR control. Enhanced functionality may incorporate the full functions of a PCS or Cellular telephone into these blocks.

The IR transmitter 1708 allows control of existing audio/video equipment 1712, 1713 and may be used in conjunction with the STB 1706 to provide an on-screen cursor-control function.

The IR receiver 1709 allows for programming the IR control codes for equipment not supported by an internal library of codes.

A display may be used for such functions as Caller ID, Last Number Dialed, and system status. A more extensive display may be incorporated into the PDA.

The speaker 1714 can be used both for allowing the STB's 1706 program to interact audibly with the user without disturbing others present, in a "Remote Locate" beeping function, and when the device is used as a telephone.

The microphone or headset 1715 can be used both for allowing the user to interact verbally with the STB 1706 (through VR), and when the device is used as a telephone, and for recording voice messages to be sent by e-mail.

The keyboard 1716 allows the composition of e-mail messages and for system control.

NETWORK ARCHITECTURE

Set-Top Box Connectivity Considerations

Set-Top Box (STB) connectivity to the virtual environment's POP (point of presence) could be achieved via the following methods:

1. Classified by communication link: PSTN, analog modem, ISDN, xDSL, cable, satellite, W-LAN (Wireless LAN), WAN, LAN, WAP (Wireless Access Protocol).

2. Classified by Applications service provider ("ASP").
  a. Connection directly to ASP. Connection to local POP: Analog, ISDN, xDSL, cable, W-LAN, WAN, LANAP
  b. Dial-up Networking to centralized ASP through call forwarding: Analog, ISDN, xDSL, Cable
  c. Connection to centralized ASP: Analog (toll-free), ISDN (toll-free), Satellite, Cable, WAN, WAP
  d. Connection to customer's own ASP and through Internet to virtual environment: Analog, ISDN, xDSL, Cable, Satellite, W-LAN, WAN, LAN, WAP
  e. Connection to ISP and through network to virtual environment: Analog, ISDN, xDSL, Cable, Satellite, W-LAN, WAN, LAN, WAP There are several embodiments of server location considerations for the virtual environment object of this invention:

Centralized model (all servers situated at the same location)

Distributed model (multiple servers serving specific region or audience with different degrees of redundancy)

Distributed location with no backup at centralized location

Distributed location with some backup at centralized location

Distributed location with full backup at centralized location (centralized mirroring)

Distributed location with backup at other regional locations (distributed mirroring)

In addition, there are several Data Center considerations for the different embodiments of the invention:

Power requirements

Multiple sources of AC power (from different power companies)

UPS

Generation Facilities

Network connectivity requirements

Multiple fiber connections to different Internet Access Providers

High Availability requirements

Network connectivity

Network equipment

Server farm

Database backup and redundancy requirements

HVAC and Air Flow/Air Exchange requirements

Plant and facilities requirements

In addition to all of the foregoing, there are several considerations that must be addressed in the different embodiments of the invention such as: location, staffing, and hours of operation.

Finally, in the different embodiments, there are several server arrangement that may be considered such as: Development Servers, Database Servers, QA Servers, Back office servers, and Intranet/Internet Web servers.

Sales fees are earned by executing purchases by subscribers from merchant partners and retailers, securing volume discounts that will be sold in the environment with quality of service and transactional support provided by a customer service staff. Eventually, the virtual shopping zone will become an online department store, offering any products desired by its members or subscribers. The virtual shopping zone is not a mere conduit between its members and vendors, earning a small transaction fee.

There will be recurring special services and subscription fees generated from customers who subscribe to a number of highly individualized premium services and information and entertainment options delivered by the environment.

Earn fees through the financing of purchases of all type of consumer goods and financial products by members through the environment (financial wallet and credit card fees.

TABLE 1

Operation of the STB, VCR and TV in various different hook-ups:

Available Modes of Operation:
* indicatesIndicates mode with STB in-line, underline indicates mode with premium (decrypted) channels.
The last entry in a row is the tuner to use once the other settings in the row are established.

| Case: | Cable Box Output: | VCR setting | TV (RF IN assumed) | | | | | |
|---|---|---|---|---|---|---|---|---|
| 1 | All Channels (asAs though not there) | RF Ch 3 (4) Out + Baseband A/V Out (standard) | Baseband A/V In | | TVtuner | | | |
| | | | | * | TV tuner = "A/V In" | STB tuner | | |
| | | | | * | TV tuner = "A/V In" | STB tuner = "A/V In" | VCR tuner | |
| | | | | * | TV tuner = "A/V In" | STB tuner = "3 (4)" | VCR tuner | |
| 2 | 3 (4), including Decrypted Channels but can be bypassed. | RF Ch 3 (4) Out + Baseband A/V Out (standard) | Baseband A/V In | | TV tuner | | | |
| | | | | * | TV tuner = "A/V In" | STB tuner | | |
| | | | | * | TV tuner = "A/V In" | STB tuner = "A/V In" | VCR tuner = 3 (4) | Cable Box tuner |
| | | | | * | TV tuner = "A/V In" | STB tuner = "A/V In" | VCR tuner = "A/V In" | Cable Box tuner |
| 3 | 3 (4), including Decrypted Channels but can be bypassed. | RF Ch 3 (4) Out + Baseband A/V Out (standard) | No Baseband A/V In | * | TV tuner = 3 (4) | STB tuner | | |
| | | | | * | TV tuner = 3 (4) | STB tuner = "A/V In" | VCR tuner = 3 (4) | Cable Box tuner |
| | | | | * | TV tuner = 3 (4) | STB tuner = "A/V In" | VCR tuner = "A/V In" | Cable Box tuner |
| 4a | 3(4), including Decrypted Channels. | RF Ch 3 (4) Out + Baseband A/V Out (standard) | Baseband A/V In | | TV tuner = 3 (4) | VCR tuner = 3 (4) | Cable Box tuner | |
| | | | | * | TV tuner = 3 (4) | VCR tuner = "A/VIn" | STB tuner = 3 (4) | Cable Box tuner |
| | | | | * | TV tuner = 3 (4) | VCR tuner = "A/V In" | STB tuner = "A/V In" | Cable Box tuner |
| | | | | | TV tuner = "A/V In" | VCR tuner = 3 (4) | Cable Box tuner | |
| | | | | * | TV tuner = "A/V In" | VCR tuner = "A/V In" | STB tuner = 3 (4) | Cable Box tuner |
| | | | | * | TV tuner = "A/V In" | VCR tuner = "A/V In" | STB tuner = "A/V In" | Cable Box tuner |
| 4b | 3 (4), including Decrypted Channels but can be bypassed. | RF Ch 3 (4) Out + Baseband A/V Out (standard) | Baseband A/V In | | TV tuner = 3 (4) | VCR tuner | | |
| | | | | * | TV tuner = 3 (4) | VCR tuner = "A/V In" | STB tuner | |
| | | | | * | TV tuner = 3 (4) | VCR tuner = "A/V In" | STB tuner = "A/V In" | Cable Box tuner |
| | | | | | TV tuner = "A/V In" | VCR tuner | | |
| | | | | * | TV tuner = "A/V In" | VCR tuner = "A/V In" | STB tuner | |
| | | | | * | TV tuner = "A/V In" | VCR tuner = "A/V In" | STB tuner = "A/V In" | Cable Box tuner |
| 4c | 3 (4), including Decrypted Channels but can be bypassed. | RF Ch 3 (4) Out + Baseband A/V Out (standard) | Baseband A/V In | | TV tuner = 3 (4) | VCR tuner | | |
| | | | | * | TV tuner = 3 (4) | VCR tuner = "A/V In" | STB tuner = 3 (4) | Cable Box tuner |
| | | | | * | TV tuner = 3 (4) | VCR tuner = "A/V In" | STB tuner "A/V In" | Cable Box tuner |
| | | | | | TV tuner = "A/V In" | VCR tuner | | |
| | | | | * | TV tuner = "A/V In" | VCR tuner = "A/V In" | STB tuner = 3 (4) | Cable Box tuner |
| | | | | * | TV tuner = "A/V In" | VCR tuner = "A/V In" | STB tuner = "A/V In" | Cable Box tuner |

TABLE 2

STB Specifications *

| Component: | Rating or Type (minimal) | Comment |
|---|---|---|
| Processor | X86 (Pentium Celeron or Duron) - class, minimum 800 MHz | |
| Main Memory | 128 MB | |
| Hard Disk | 20 GB | Probably no smaller available. |
| Removable Disk Drive | DVD | CD would be adequate, but a DVD has marketing advantages. A Floppy drive is out of the question: the User would think of the machine as a scary computer. |
| Removable Disk | DVD-ROM w/ OS, operating code. | |
| GPU | NVIDIA GeForce MX | |
| GPU Memory | 32 MB | |
| Uncommitted I/O | 10/100 Base-T, two USB | |
| IR Communications | IR receiver for 40 kHz consumer band, IR blaster port for transmitting. | |
| Peripherals | Modified Cordless Telephone for Voice Remote Control (and 56k modem), IR keyboard (40 kHz, not IRDA). | Passive Pointing Device (PPD) for later, IR Remote Control, or IR Remote Control w/RF, Voice added to be optional. |

* Note that these are off-the-shelf components

TABLE 3

Phone VRC Commands

| Command Name | Accomplishes | |
|---|---|---|
| HookSw(R ) | R = 0: Just report hookswitch status.<br>R = 1: Open the hookswitch.<br>R = 2: Close the hookswitch.<br>R = 3: Restore local hookswitch control. | 1 |
| AudioPipeOpen (P) | Create and Open an isochronous pipe for audio. Not all of these may be possible, not all may be possible simultaneously, but the first two are necessary.<br>P = 1: From HS microphone to computer.<br>P = 2: From computer to HS speaker.<br>P = 3: From phone line to computer (remote control).<br>P = 4: From computer to phone (remote control).<br>P = 5: From speakerphone microphone to computer.<br>P = 6: From computer to speakerphone speaker. | 1 |
| AudioPipeClose (P) | Similar to above. | 1 |
| DataPipeOpen ( ) | For (56k) modem use. | 2 |
| DataPipeClose ( ) | For (56k) modem use. | 2 |
| Various Modem Commands | For (56k) modem use. | 2 |
| SpeedDialReport (N) | Returns the contents of a Speed-dial entry. | 4 |
| SpeedDialSet (N, [n] ) | Sets the contents of a Speed-dial entry. (Maintain the list on the computer, but it works when the computer is off! Magic!) | 4 |
| GetCallIDs ( ) | Returns contents of all, if any, new Caller ID entries. | 4 |
| GetLastNumbers ( ) | Returns contents of all, if any, new dialed number entries. | 4 |
| DialDigit (n, t) | Generate a DTMF digit (including pause) for (t*10) ms (dial). (It may also be possible to use this to invoke other "phone tones" like ringback, busy, etc. if n > 16.) | 2 |
| DialNumber ([n] ) | Generate a sequence of DMTF digits (including pause) (dial). | 3 |
| MakeRingTone (t) | Activate the electronic ringer, either default cadence (t = 0) or for a multiple of 500 ms (t = integer). | 3 |
| InvokeButton (N) | JIC, for volume control and stuff. | 3 |
| SetSpkrVol (n) | Speakerphone volume | 4 |
| SetEPVol (n) | Earpiece volume | 4 |
| Reset ( ) | Always handy. | |

Thus, there has been shown and described a method and apparatus for delivering a virtual reality environment which fulfills all the objects and advantages sought therefor. The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims.

What is claimed is:

1. A method, comprising the steps of:

communicating with a participant using an input/output arrangement to obtain at least one of background information and preference information;

generating a participant profile as a function of the background information, the participant profile including at least one of the participant identity and participant personal information;

creating a virtual reality environment using at least one of the participant profile and the preference information, the virtual reality environment including a virtual personal assistant and being presented to the participant via the input/output arrangement;

receiving a request from the participant using the virtual personal assistant;

processing the request using an artificial intelligence engine and at least one of the preference information and the participant profile to generate request data, wherein the request data is configured to restrict the transfer of the participant identity and the participant personal information via the communications network;

obtaining a response data as a function of the request data from at least one remote location via a communications network, the response data including at least one of information, product data and service data; and providing the response data to the participant via the virtual reality environment.

2. A method, comprising the steps of:

communicating with a participant using an input/output arrangement to obtain at least one of background information and preference information;

generating a participant profile as a function of the background information, the participant profile including at least one of a participant identity and participant personal information;

creating a virtual reality environment using at least one of the participant profile and the preference information, the virtual reality environment including a virtual personal assistant and being presented to the participant via the input/output arrangement;

receiving a request from the participant using the virtual personal assistant;

processing the request using an artificial intelligence engine and at least one of the preference information and the participant profile to generate request data, including:
  encrypting at least a portion of the request data; and
  transmitting the encrypted request data to the at least one remote location via the communications network;

obtaining a response data as a function of the request data from at least one remote location via a communications network, the response data including at least one of information, product data and service data; and providing the response data to the participant via the virtual reality environment.

3. A system, comprising:

a memory storage device storing a participant profile generated as a function of background information, the participant profile including at least one of a participant identity and participant personal information;

an input/output arrangement communicating with the participant to obtain at least one of the background information and preference information, the input/output arrangement configured to present a virtual reality environment created as a function of at least one of the participant profile and the preference information, the virtual reality environment including a virtual personal assistant which receives a request from the participant;

an artificial intelligence engine processing the request to generate request data as a function of the request and at least one of the preference information and the participant profile, wherein the request data is configured to restrict the transfer of the participant identity and the participant personal information via the communications network; and a communications arrangement connected to at least one remote location via a communications network to obtain response data, the response data is a function to the request data and includes at least one of information, product data and service data.

4. A system, comprising:

a memory storage device storing a participant profile generated as a function of background information, the participant profile including at least one of a participant identity and participant personal information;

an input/output arrangement communication with the participant to obtain at least one of the background information and preference information, the input/output arrangement configured to present a virtual reality environment created as a function of at least one of the participant profile and the preference information, the virtual reality environment including a virtual personal assistant which receives a request from the participant;

an artificial intelligence engine processing the request to generate request data as a function of the request and at least one of the preference information and the participant profile, wherein the artificial intelligence engine is configured to encrypt at least a portion of the request data and transmit the encrypted request data to at least one remote location via the communications network; and a communications arrangement connected to at least one remote location via a communications network to obtain response data, the response data is a function of the request data and includes at least one of information, product data and service data.

* * * * *

UNITED STATES PATENT AND TRADEMARK OFFICE
CERTIFICATE OF CORRECTION

PATENT NO. : 7,319,992 B2  Page 1 of 1
APPLICATION NO. : 09/964224
DATED : January 15, 2008
INVENTOR(S) : Maria Gaos It is certified that error appears in the above-identified patent and that said Letters Patent is hereby corrected as shown below:

Column 17, Line 39, "E-conamerce" should be changed to --E-commerce--.

Column 29, Line 26, "STE" should be changed to --STB--.

Column 33, Line 16, "DIOS" should be changed to --BIOS--.

Column 33, Line 44, "function of the" should be changed to --function to the--.

Signed and Sealed this

Third Day of June, 2008

JON W. DUDAS
*Director of the United States Patent and Trademark Office*